United States Patent
Uchiyama et al.

(10) Patent No.: US 6,268,862 B1
(45) Date of Patent: *Jul. 31, 2001

(54) THREE DIMENSIONAL VIRTUAL SPACE GENERATION BY FUSING IMAGES

(75) Inventors: Shinji Uchiyama, Yokohama; Akihiro Katayama, Yokosuka; Masahiro Shibata, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 193 days.

(21) Appl. No.: 08/812,388

(22) Filed: Mar. 5, 1997

(30) Foreign Application Priority Data

Mar. 8, 1996 (JP) ................................................ 8-051519
Jul. 9, 1996 (JP) ................................................ 8-179084

(51) Int. Cl.[7] ....................................................... G06T 17/00
(52) U.S. Cl. ............................................ 345/427; 345/419
(58) Field of Search ................................. 345/427, 474, 345/419, 433, 418, 428, 429, 473

(56) References Cited

U.S. PATENT DOCUMENTS

| | | | |
|---|---|---|---|
| 5,123,084 | * 6/1992 | Prevost et al. | 345/420 |
| 5,414,801 | 5/1995 | Smith et al. | 395/119 |
| 5,479,597 | 12/1995 | Fellous | 395/154 |
| 5,577,960 | * 11/1996 | Sasaki | 463/32 |
| 5,644,694 | * 7/1997 | Appleton | 345/474 |
| 5,684,943 | * 11/1997 | Abraham et al. | 345/473 |
| 5,687,307 | * 11/1997 | Akisada et al. | 345/437 |
| 5,696,892 | * 12/1997 | Redmann et al. | 345/425 |
| 5,715,384 | 2/1998 | Ohshima et al. | 395/128 |
| 5,819,016 | * 10/1998 | Watanabe et al. | 345/419 |

FOREIGN PATENT DOCUMENTS

WO 97/03416  1/1997  (WO).

OTHER PUBLICATIONS

L. Blonde, et al., "A Virtual Studio for Live Broadcasting: The Mona Lisa Project", IEEE Multimedia, vol. 3, No. 2, pp. 18–28 (Jun. 1, 1996).

A, Katayama, et al., "A Viewpoint Dependent Stereoscopic Display Using Interpolation of Multi–Viewpoint Images", Proceedings of the SPIE, vol. 2409, pp. 11–20 (Feb., 1995).

* cited by examiner

Primary Examiner—Cliff N. Vo

(57) ABSTRACT

A three-dimensional space is generated using shape model data and its surface characteristic and pattern, a space is rebuilt from the three-dimensional space as an image in accordance with a drawing specification determined by the viewpoint position, direction, angle of view, and the like, and an image is generated from light space data using the drawing specification. The images generated based on the shape model data and the light space data are fused, thereby easily generating and fusing shape model data and an actually taken image, and displaying an image with high reality.

32 Claims, 22 Drawing Sheets

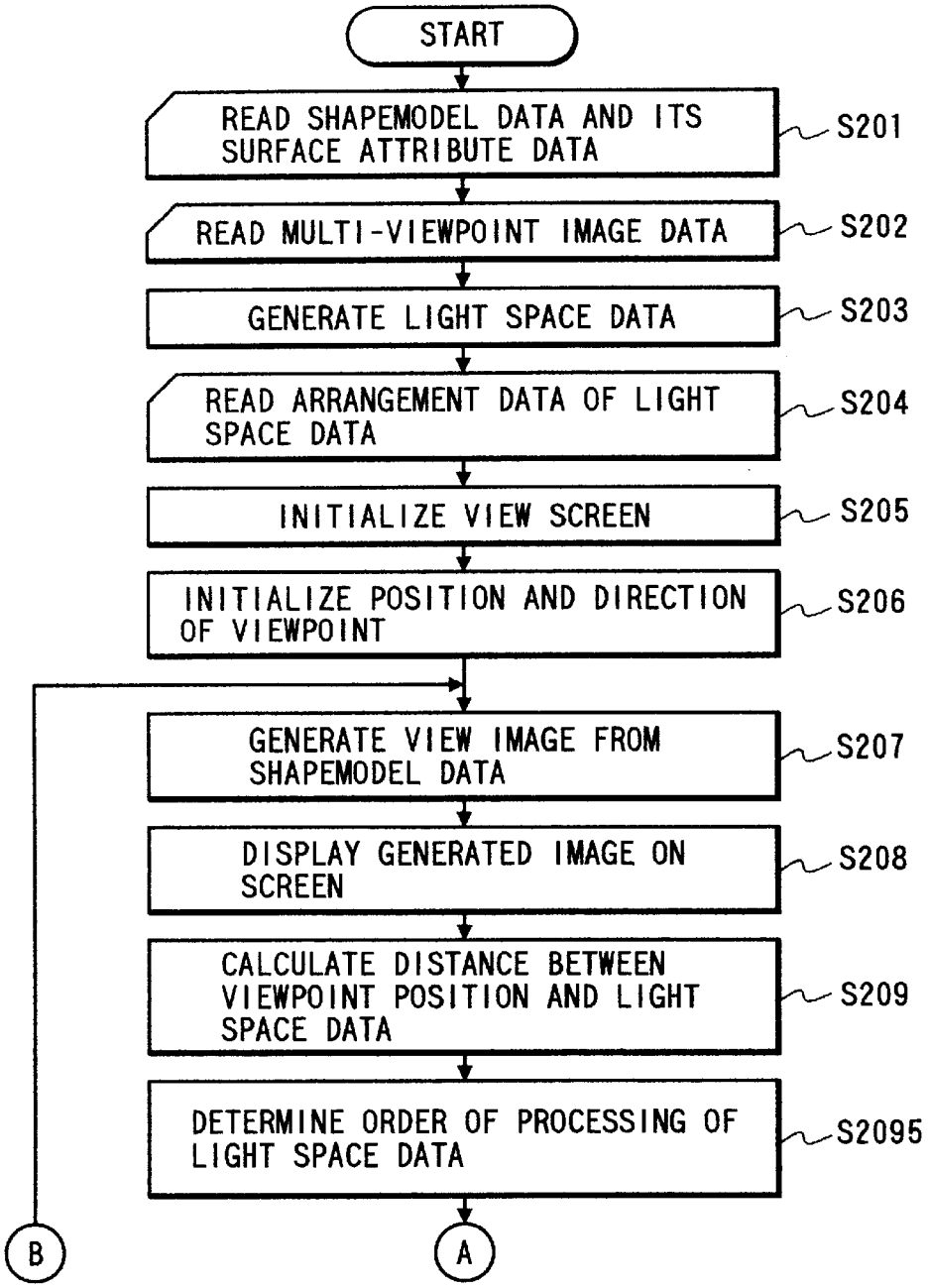

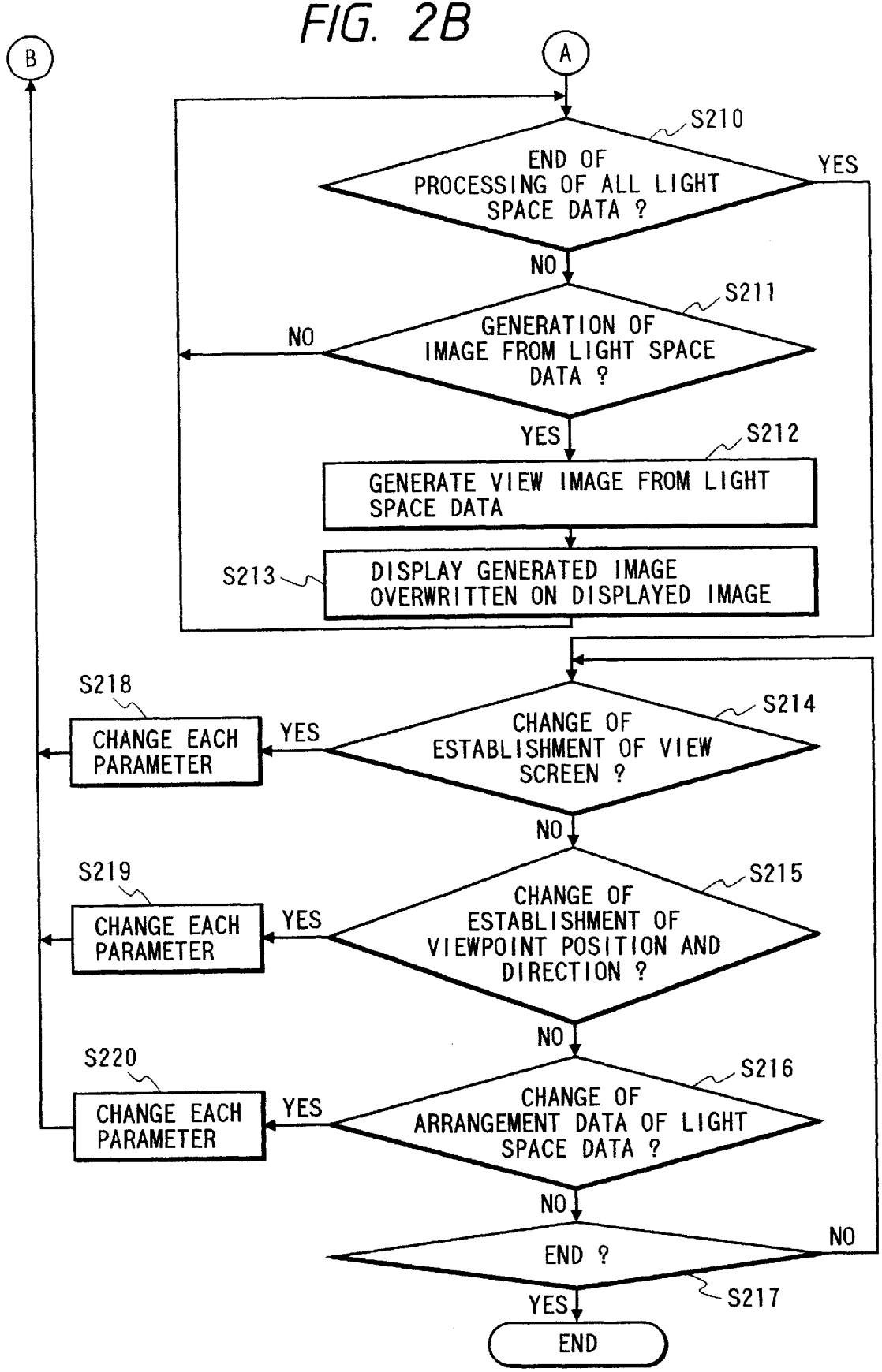

DEFINITION OF $(\phi, \psi)$

FIG. 22

```
Separator {  ←──── ROUTE
    Separator {
        Transform {
            COORDINATE TRANSFORMATION T₁
        }
        Camera {
            INFORMATION ON POSITION, ANGLE OF VIEW AND THE LIKE
        }
    }
    Separator {
        Transform {
            COORDINATE TRANSFORMATION T₂
        }
        ShapeModel {
            SHAPE OF ROOM
        }
        Separator {
            Transform {
                COORDINATE TRANSFORMATION T₃
            }
            ShapeModel {
                SHAPE OF TABLE
            }
            Separator {
                Transform {
                    COORDINATE TRANSFORMATION T₅
                }
                ShapeModel {
                    SHAPE OF POT
                }
            }
            Separator {
                Transform {
                    COORDINATE TRANSFORMATION T₆
                }
                LIGHT SPACE DATA {
                    OBJECT
                }
            }
        }
        Separator {
            Transform {
                COORDINATE TRANSFORMATION T₄
            }
            ShapeModel {
                SHAPE OF SOFA
            }
        }
    }
}
```

THREE DIMENSIONAL VIRTUAL SPACE GENERATION BY FUSING IMAGES

BACKGROUND OF THE INVENTION

1. Field of the Invention

The present invention relates to an image processing method and apparatus for generating and displaying a virtual environment for virtual reality.

2. Related Background Art

As a conventional method of expressing a three-dimensional object and space, and presenting a view image from an arbitrary position and direction, the following methods are known:

(1) A three-dimensional object or space is expressed using shape model data such as polygon data, curved surface data, and the like, texture data representing the surface attribute or pattern, light source data, and the like, and the view image of the space from an arbitrary position and direction is drawn by the rendering technique of computer graphics.

(2) Upon creating a three-dimensional virtual environment using the conventional method (1), elements (coordinate transformation data, shape data, surface attribute data, illumination, and the like) that make up the virtual environment are expressed by a tree structure. That is, a space, ground, architecture, room, furniture, illumination, ornament, and the like that make up the three-dimensional space originally have a hierarchical nesting relationship thereamong. For example, an ornament on a table depends on the table arrangement so that it moves together with the table arrangement, and it is often convenient to arrange such ornament relative to the coordinate system of the table. For this reason, a data structure having hierarchical dependence on the arrangement is used. As a method of expressing such structure, a virtual environment is expressed by an n-ary tree structure.

For example, FIG. 18 shows an illustration example of a certain simple virtual environment. In the case of this figure, paying attention to a room, table, and sofa, the room is described on a coordinate system $C_2$ transformed from a world coordinate system $C_0$ by a coordinate transformation $T_2$, and the table and sofa in the room are respectively described on coordinate systems $C_3$ and $C_4$ transformed from the coordinate system $C_2$ by coordinate transformations $T_3$ and $T_4$. A pot on the table is described on a coordinate system $C_5$ transformed from the coordinate system $C_3$ by a coordinate transformation $T_5$. Furthermore, ray (or light) space data is arranged on the desk. This data is described on a coordinate system $C_6$ transformed from the coordinate system $C_3$ by a coordinate transformation $T_6$ as in the pot. When these objects are expressed by a typical tree structure, a tree shown in FIG. 19 is obtained.

(3) The images of a three-dimensional object or space are taken in advance from a large number of viewpoints, an image taken under a phototaking condition close to a desired view position and direction is selected from the taken images, and a three-dimensional object viewed from the position and direction close to the view position and direction is displayed, thereby approximately expressing a view from an arbitrary position and direction.

(4) Ray space data is generated on the basis of the actually taken images of a three-dimensional object or space, and an image viewed from an arbitrary position and direction is generated and displayed on the basis of the ray space data, thereby reconstructing the three-dimensional object or space.

In this method, an object is expressed as a set of light components emanating from the object without calculating the shape of the object.

(5) A panorama image obtained by looking around from a given viewpoint is input, and an image corresponding to the view direction of the viewer is generated based on the panorama image (mainly attained by extracting a partial image from the panorama image and correcting distortion of the extracted image), thereby displaying a three-dimensional space from a given point.

However, the above-mentioned conventional methods (1) to (5) suffer the following problems.

It is difficult for the conventional method (1) to generate or reconstruct the shape data of an object having a very complicated shape. Furthermore, it is also difficult for the method (1) to acquire the shape data of an object with a complicated shape from a real object using a three-dimensional measurement apparatus. In particular, it is more difficult for the method (1) to reconstruct a real object having an existing complicated shape or a complicated surface pattern or reflection characteristics (absorption/transmission characteristics). Furthermore, the method (1) is generally easy to express an artificial object but is hard to express a natural object. However, this method has a merit, i.e., it can express an artificial, simple three-dimensional space such as a room, a row of stores and houses, or the like, which is mainly built of planes with a small data volume.

The conventional method (2) is an expression/description method of data, and suffers the problems of the conventional method (1). However, this expression/description method of data is an excellent one.

In the conventional method (3), the above-mentioned problems are not posed. However, since the images to be finally presented must be taken in advance, a very large number of images must be prepared and a huge data volume is required, so as to artificially obtain an arbitrary viewpoint position and direction. In view of the data volume and phototaking required for obtaining a large number of images, it is impossible to put this method into practical applications. For the same reason, it is nearly impossible to hold every data to express a wide three-dimensional space such as a room, a row of stores and houses, and the like. This method is suitable for expressing a three-dimensional object by taking the images of the object from its surrounding positions.

In the conventional method (4), a large number of images need not be taken in advance unlike in the conventional method (3). Once ray space data is generated based on a predetermined number of images taken in advance, a view image from an arbitrary viewpoint position can be generated (strictly speaking, there is a constraint condition). However, in order to present images from every position in a three-dimensional space, a huge volume of ray space data must also be generated and held. This method is also suitable for a three-dimensional object as in the conventional method (3), but is not suitable for expressing a three-dimensional space such as a room, a row of stores and houses, or the like.

The conventional method (5) is suitable for expressing a three-dimensional space such as a room, a row of stores and houses, or the like, and a view image in an arbitrary direction can be presented as long as the viewpoint position is limited. However, when the viewpoint position is to be arbitrarily moved, panorama images from a very large number of viewpoint positions must be prepared in advance to express an arbitrary movement by approximation. Accordingly, a very large number of panorama images must be prepared.

For this reason, it is difficult in practice to attain viewing from an arbitrary viewpoint position owing to a huge data volume and difficulty in phototaking. Hence, this processing is normally realized by reducing the data volume and allowing only discrete movements of the viewpoint position.

Furthermore, the conventional methods (1) and (2), and the methods (3), (4), and (5) are fundamentally different techniques, and there is no method that can utilize their characteristics and combine these methods by effectively using only their merits.

SUMMARY OF THE INVENTION

It is an object of the present invention to provide an image processing method and apparatus, which can utilize the characteristics of the conventional methods (1) and (2), and methods (3), (4), and (5), which are originally different techniques, and can combine these methods to effectively take an advantage of only their merits.

In order to achieve the above object, an image processing method according to the present invention is an image processing method of generating and displaying a virtual environment, comprising:

the model space rebuilding step of generating a three-dimensional space using shape model data, and rebuilding the space as an image from the three-dimensional space in accordance with a first drawing specification at a given viewpoint;

the actually taken image-based image generation step of generating an image from an arbitrary viewpoint on the basis of an actually taken image in accordance with a second drawing specification that uses the same view condition as a view condition used by the first drawing specification; and the image fusion step of fusing the image rebuilt in the model space rebuilding step and the image generated in the actually taken image-based image generation step.

In order to achieve the above object, an image processing apparatus according to the present invention is an image processing apparatus for generating and displaying a virtual environment, comprising:

model space rebuilding means for generating a three-dimensional space using shape model data, and rebuilding the space as an image from the three-dimensional space in accordance with a first drawing specification at a given viewpoint;

actually taken image-based image generation means for generating an image from an arbitrary viewpoint on the basis of an actually taken image in accordance with a second drawing specification that uses the same view condition as a view condition used by the first drawing specification; and image fusion means for fusing the image rebuilt by the model space rebuilding means and the image generated by the actually taken image-based image generation means.

In order to achieve the above object, an image processing method according to the present invention is an image processing method of generating a virtual environment, comprising:

the first description step of describing a shape of a three-dimensional object and a shape of a three-dimensional space on the basis of information including a three-dimensional position, a three-dimensional direction, and a surface color;

the second description step of describing a three-dimensional object and a three-dimensional space on the basis of an actually taken image taken from an arbitrary position; and the generation step of generating the virtual environment by fusing the shapes described in the first description step and the three-dimensional object and the three-dimensional space described in the second description step.

In order to achieve the above object, an image processing apparatus according to the present invention is an image processing apparatus for generating a virtual environment, comprising:

first description means for describing a shape of a three-dimensional object and a shape of a three-dimensional space on the basis of information including a three-dimensional position, a three-dimensional direction, and a surface color;

second description means for describing a three-dimensional object and a three-dimensional space on the basis of an actually taken image taken from an arbitrary position; and generation means for generating the virtual environment by fusing the shapes described by the first description means and the three-dimensional object and the three-dimensional space described by the second description means.

BRIEF DESCRIPTION OF THE DRAWINGS

FIG. 2 which is composed of FIGS. 2A and 2B is a flow chart showing the flow of the processing of the first embodiment;

FIG. 22 is a view showing data that express the tree structure shown in FIG. 20 by text data.

DETAILED DESCRIPTION OF THE PREFERRED EMBODIMENTS (a) First Embodiment

Figure 1:
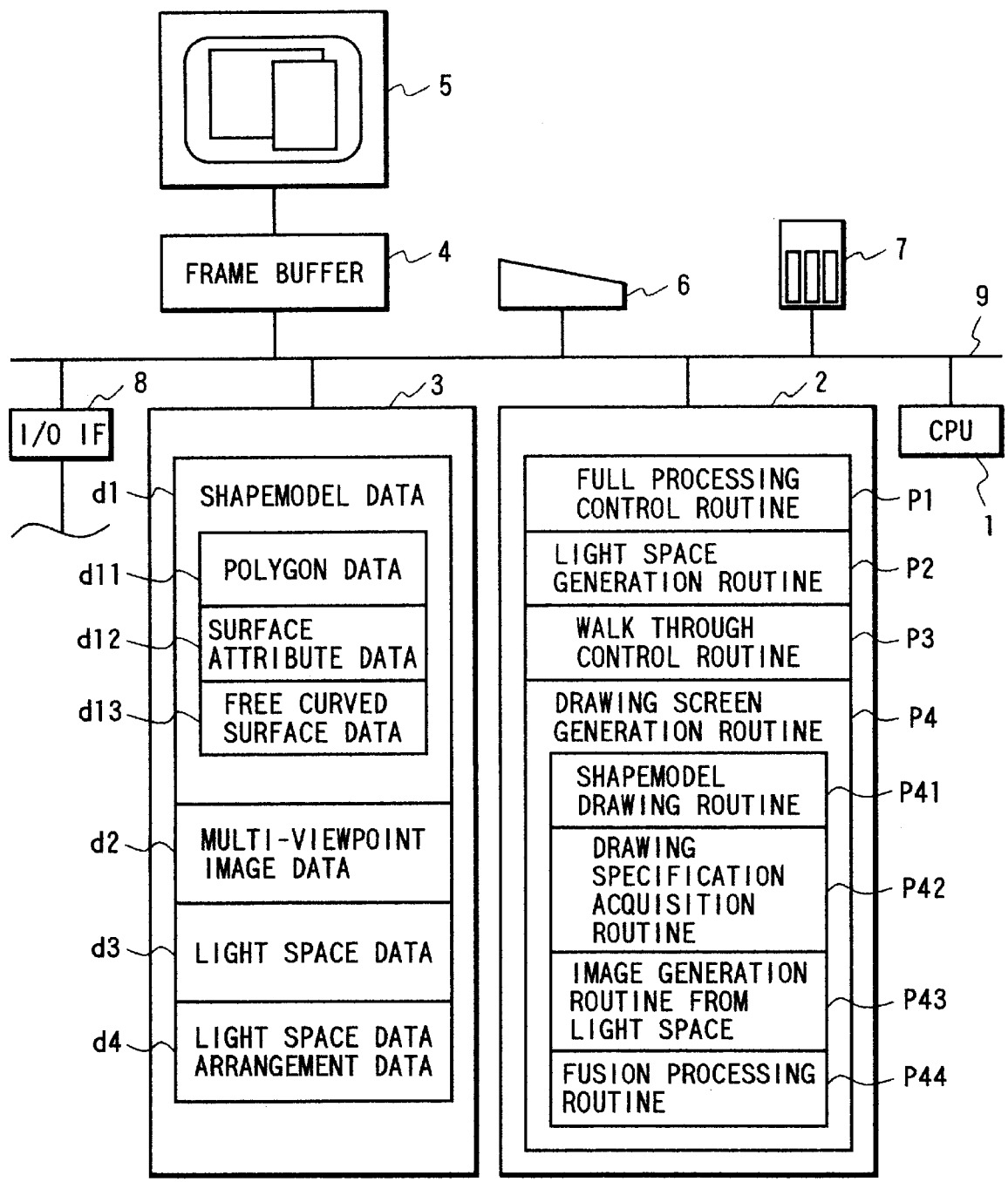
FIG. 1 is a block diagram of a virtual environment generation realization apparatus according to the first embodiment of the present invention.

FIG. 1 is a block diagram of a virtual environment generation realization apparatus according to the first embodiment. A CPU 1 executes programs writing the processing procedures of the first embodiment. A processing procedure storage device 2 stores the programs writing the processing procedures. The programs may be pre-stored in the processing procedure storage device 2 but may be supplied from a storage medium such as an FD, CD-ROM, ROM, magnetic tape, or the like via an input/output interface (I/O IF) 8 (to be described later). A data storage device 3 holds data which are generated or input before, after, and during processing. A frame buffer 4 stores an image which is to be supplied to a display device to present an intermediate or final processing result. A window system 5 of an image display device displays the image stored in the frame buffer 4. A keyboard 6 is used for inputting characters and instructions during processing. The I/O IF 8 interfaces with external devices to exchange data and the processing procedures. A bus 9 connects the above-mentioned devices.

The data storage device 3 stores:
shape model data d1, which include
   polygon data d11,
   surface attribute data d12, and
   free curved surface data d13,
multi-viewpoint image data d2;
light space data d3; and
light space data arrangement data d4.
Also, the processing procedure storage device 2 stores:
a full processing control routine p1;
a light space generation routine p2;
a walk through control routine p3; and
a drawing screen generation routine p4, which includes
   a shape model drawing routine p41,
   a drawing specification acquisition routine p42,
   an image generation routine p43 from a light space, and
   a fusion processing routine p44.

FIGS. 2A and 2B are flow charts showing the flow of the processing of the first embodiment. Programs that realize the processing of this flow chart are stored in the processing procedure storage device 2.

In step S201, shape model data d1 and its surface attribute data d12, created in advance by a modeler apparatus which can create shape model data d1 of some computer graphics and its texture data, are input from an external device to the data storage device 3 via the I/O IF 8. The shape model data d1 includes polygon data d11 such as triangle patches, free curved surface data d13 such as NURBS, and the like. The surface attribute data d12 includes the reflection characteristics and pattern of the corresponding shape data. In this case, texture data representing a pattern is input as the surface attribute data d12. The texture data represents the surface pattern of polygon data d11, free curved surface data d13, and the like, and describes the correspondence between the image data and shape. In step S202, multi-viewpoint image data d2 are input from an external device to the data storage device 3 via the I/O IF 8. The multi-viewpoint image data d2 include a group of images taken from a plurality of positions. In step S203, light space data d3 is generated on the basis of the multi-viewpoint image data d2 in accordance with the light space generation routine p2 stored in the processing procedure storage device 2, and the generated data d3 is stored in the data storage device 3. The multi-viewpoint image data d2 and light space data d3 input and generated in steps S202 and S203 are prepared in units of objects to be viewed, and a plurality of sets of data are prepared. The method of generating the light space data d3 in step S203 will be described below.

Figure 3A:
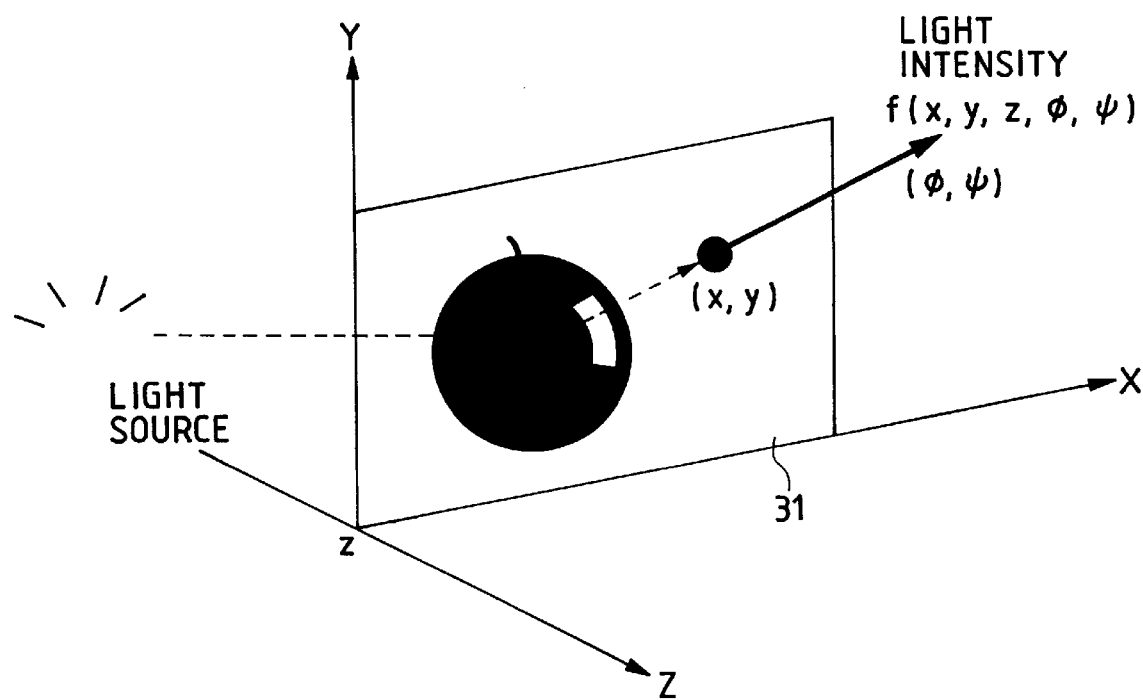
FIGS. 3A and 3B are views of a three-dimensional space for explaining the principle of a light space.
Figure 3B:
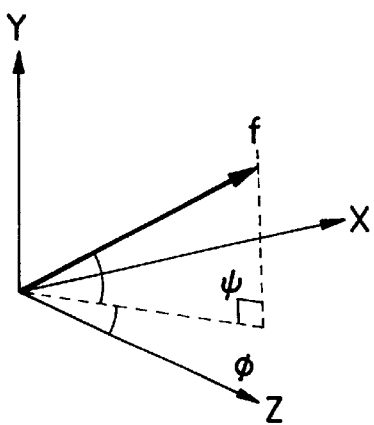
Figure 4B:
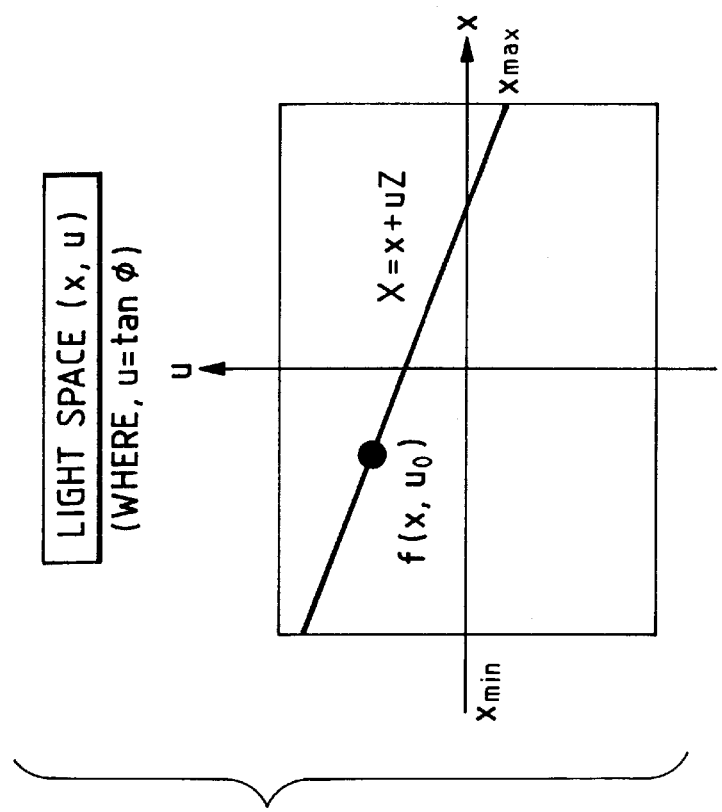
FIGS. 4A and 4B are views showing the relationship between light rays in a real space and light space.
Figure 4A:
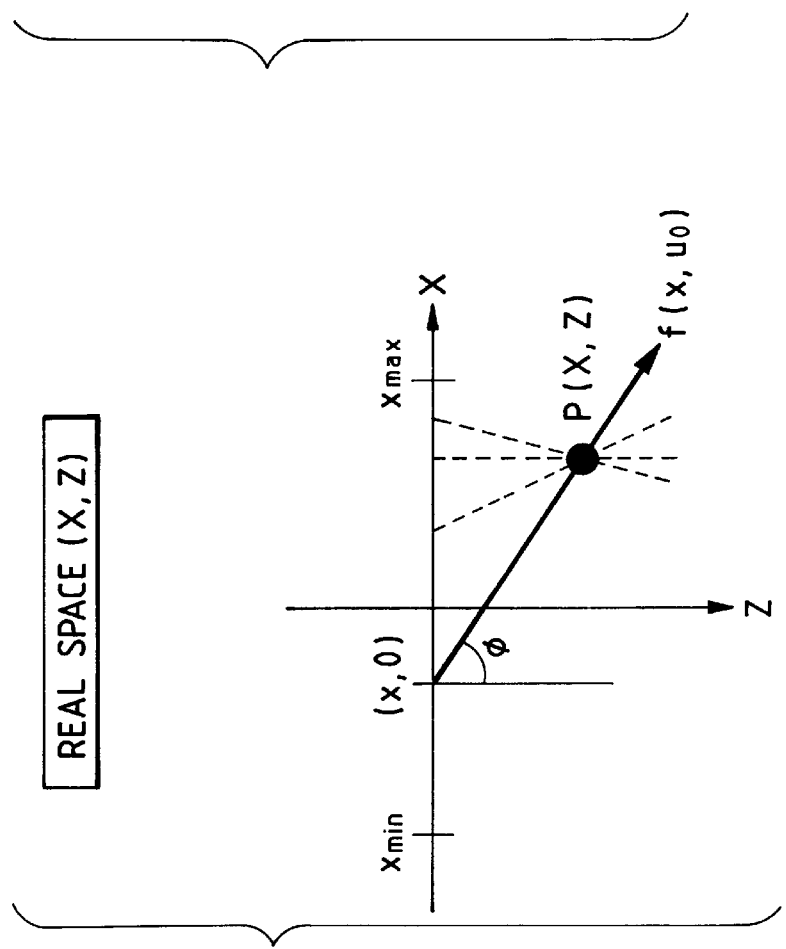

A technique for assuming a plane of z=0 (to be referred to as a reference plane 31 hereinafter) on a coordinate system as shown in FIG. 3A, and expressing a three-dimensional space as a set of light rays that pass through this plane has been proposed. As shown in FIG. 4A, in this technique, an image that can be viewed from a viewpoint position P falling within a range $Z \geq 0$ in the three-dimensional space is equivalent to an image obtained by sampling only light rays that pass P from the set of light rays that pass through the reference plane 31. Each light ray is expressed by a position (x, y) where it passes through the reference plane, angles φ and ω the light ray makes with the x- and y-axes (FIG. 3B), time t at which the light ray passes through the plane, and a color (r, g, b) of the light ray. However, in practice, an object is assumed to be a still object and to have no parallax in the y-axis direction since the computation volume and data volume become huge if all these data are used. Under this assumption, light rays are projected onto an x-u space using u=tan φ, and when the light space is to be processed in the projected x-u space, light rays that pass a given point P define a linear path, as shown in FIG. 4B. This path is given by:

$$x = X - Z \cdot u \quad (1)$$

$$u = \tan \phi \quad (2)$$

where (X, Z) represents the viewpoint position, and x represents the position of the intersection between each light ray and the x-axis on the x-u space. Also, φ represents the angle which the light ray makes with the z-axis.

Figure 5B:
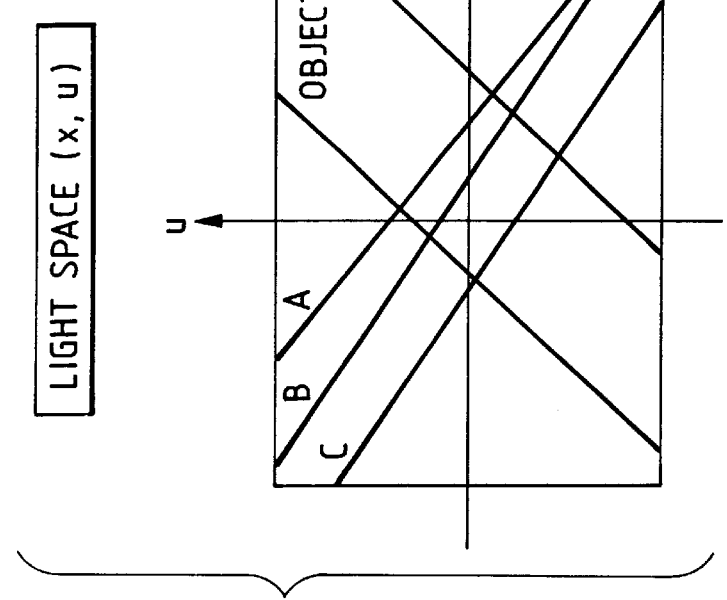
FIGS. 5A and 5B are views showing the principle of inter-transformation between the real space and light space.
Figure 5A:
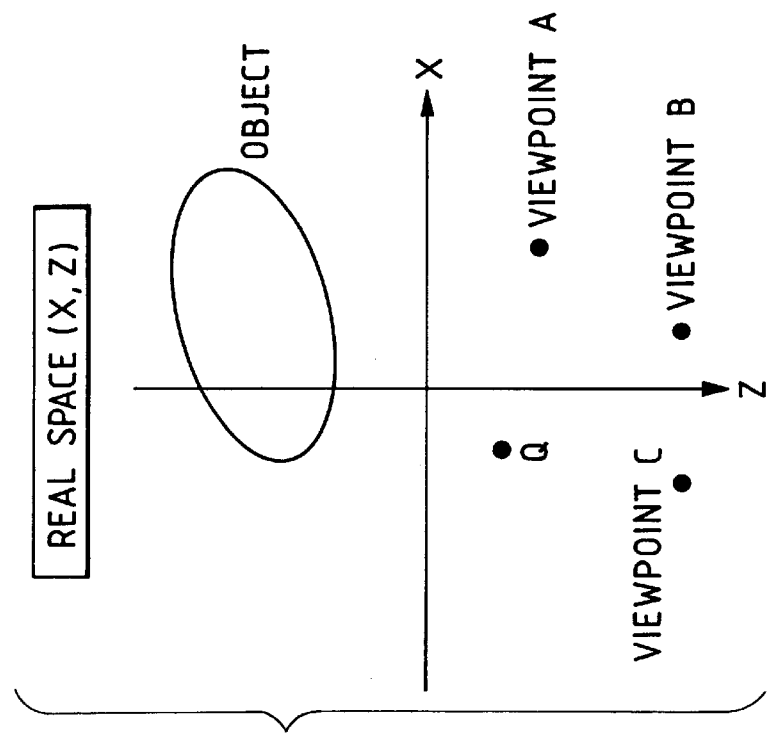

Subsequently, as shown in FIG. 5A, a linear path is calculated based on images obtained at a large number of viewpoint positions, and it is assumed that the x-u space is filled with these paths at high density. At this time, an image at a viewpoint position Q falling within the range $z \geq 0$ in FIG. 5A can be obtained by calculating the paths of light rays that pass the position Q on the x-u space and acquiring the colors of light rays already recorded on the paths, as shown in FIG. 5B. Generation of light space data in step S203 corresponds to mapping data of multi-viewpoint image data on the x-u space in the above-mentioned processing.

In step S204, arrangement data d4 indicating the arrangement of each light space data d3 with respect to the shape model data d1 is input from an external device to the data storage device 3 via the I/O IF 8. The arrangement data d4 defines the position and direction of the reference plane which is set in the three-dimensional space upon generating light space data d3 and through which light passes.

Figure 6:
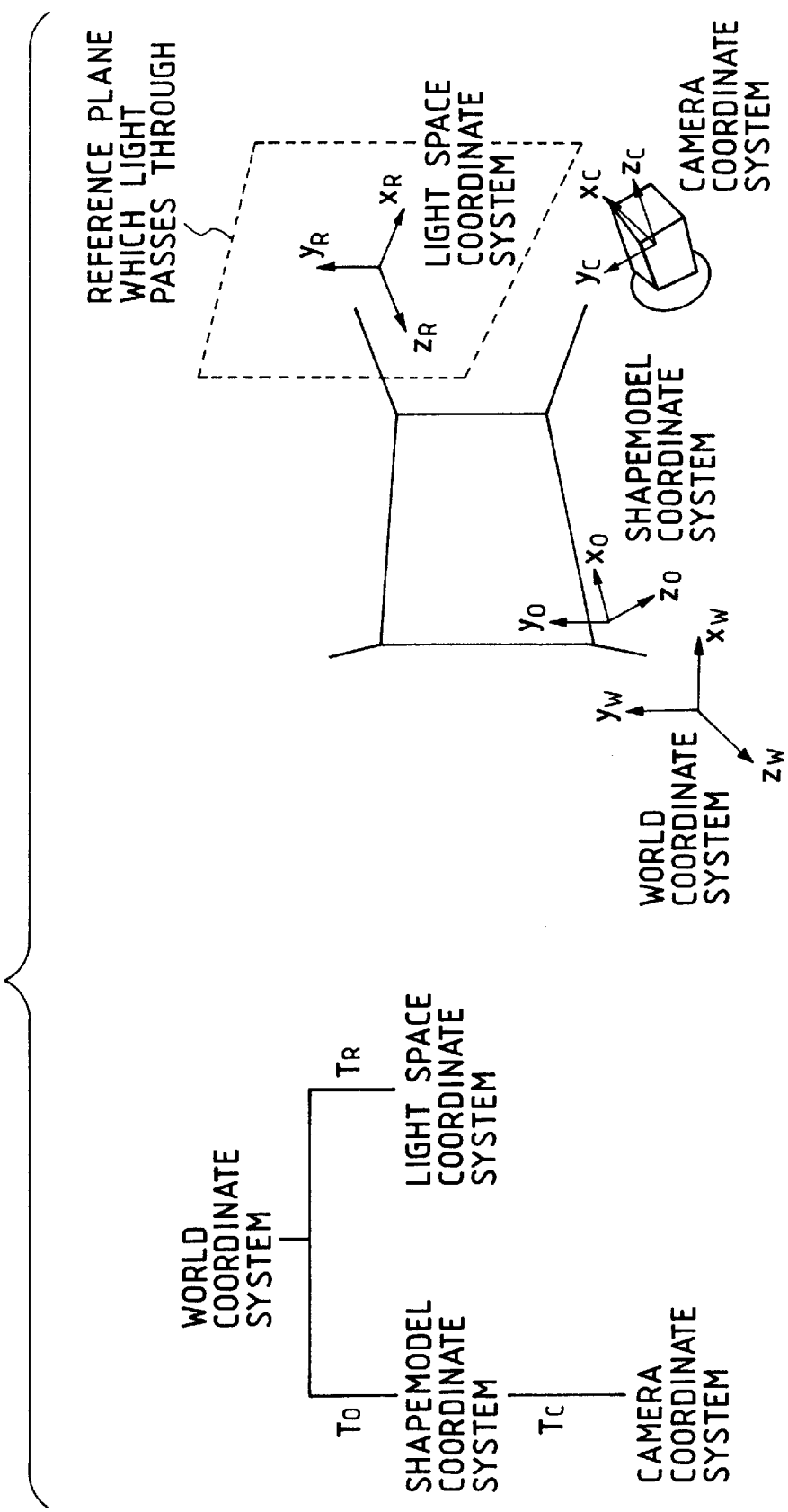
FIG. 6 is a schematic view showing the dependence among coordinate systems that express arrangement data of light space data.

FIG. 6 is a schematic view showing the arrangement at that time. In FIG. 6, a coordinate system transformed from the world coordinate system by a coordinate transformation $T_R$ is a light space coordinate system (a coordinate system in a Euclidean space where the reference plane is present). On the other hand, a coordinate system transformed from the world coordinate system by a coordinate transformation $T_o$ is a shape model coordinate system, and a coordinate system further transformed from the shape model coordinate system by a coordinate transformation $T_c$ is a camera coordinate system.

Also, a view range that defines a scope within which an image can be generated based on light space data d3 is included in the arrangement data d4.

Figure 7:
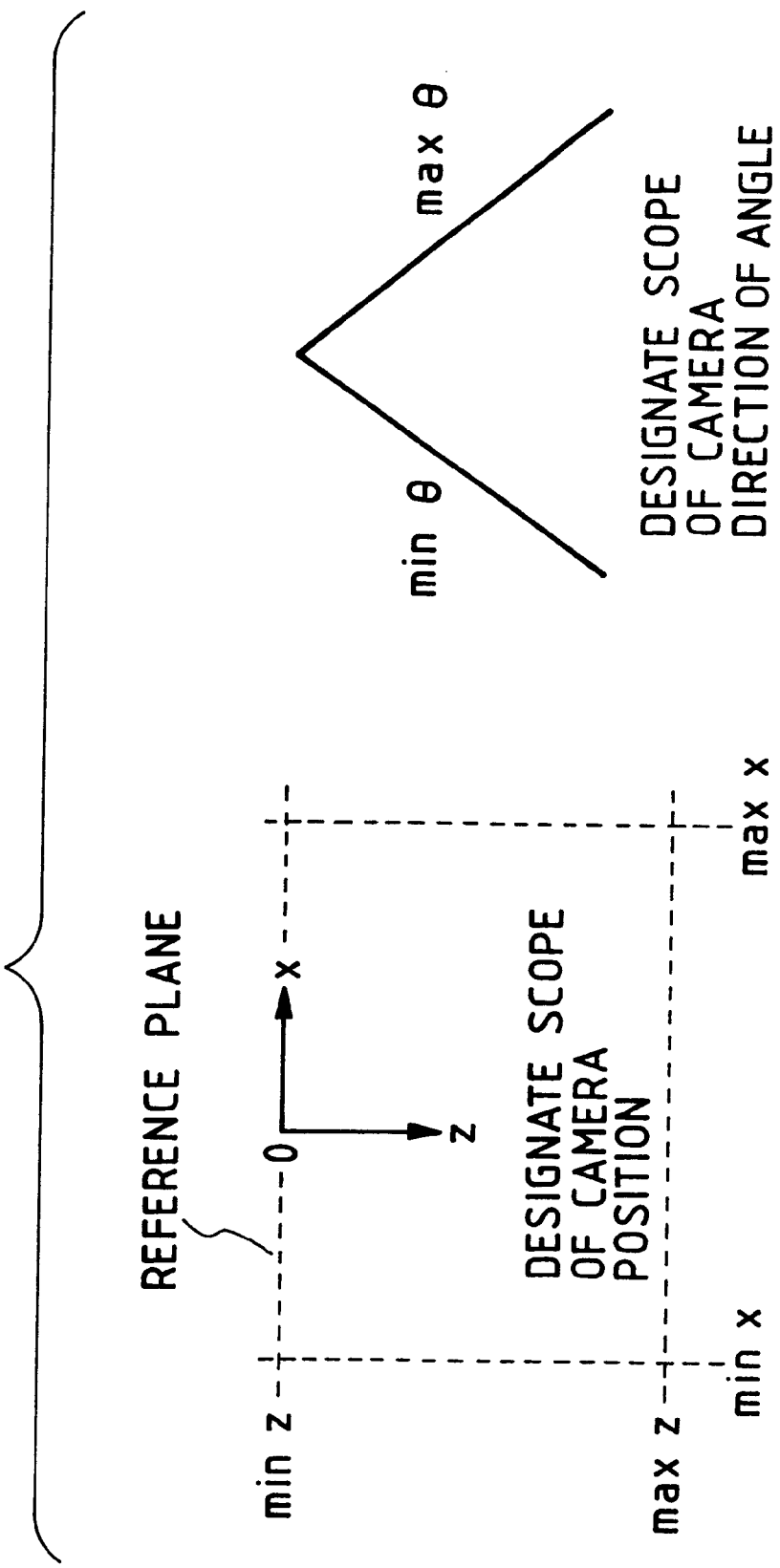
FIG. 7 is a schematic view showing the region for performing drawing discrimination of one arrangement data of light space data.

FIG. 7 is a schematic view associated with the generation scope. The angle of the camera direction changes from min$\theta$ to max$\theta$, the x-coordinate of the camera position changes from minx to maxx, and the z-coordinate thereof changes from minz to maxz.

In step S205, the size of the view screen and the angle of view of a virtual camera are initialized.

In step S206, the initial position and direction of the viewer in a virtual space are designated.

Figure 8:
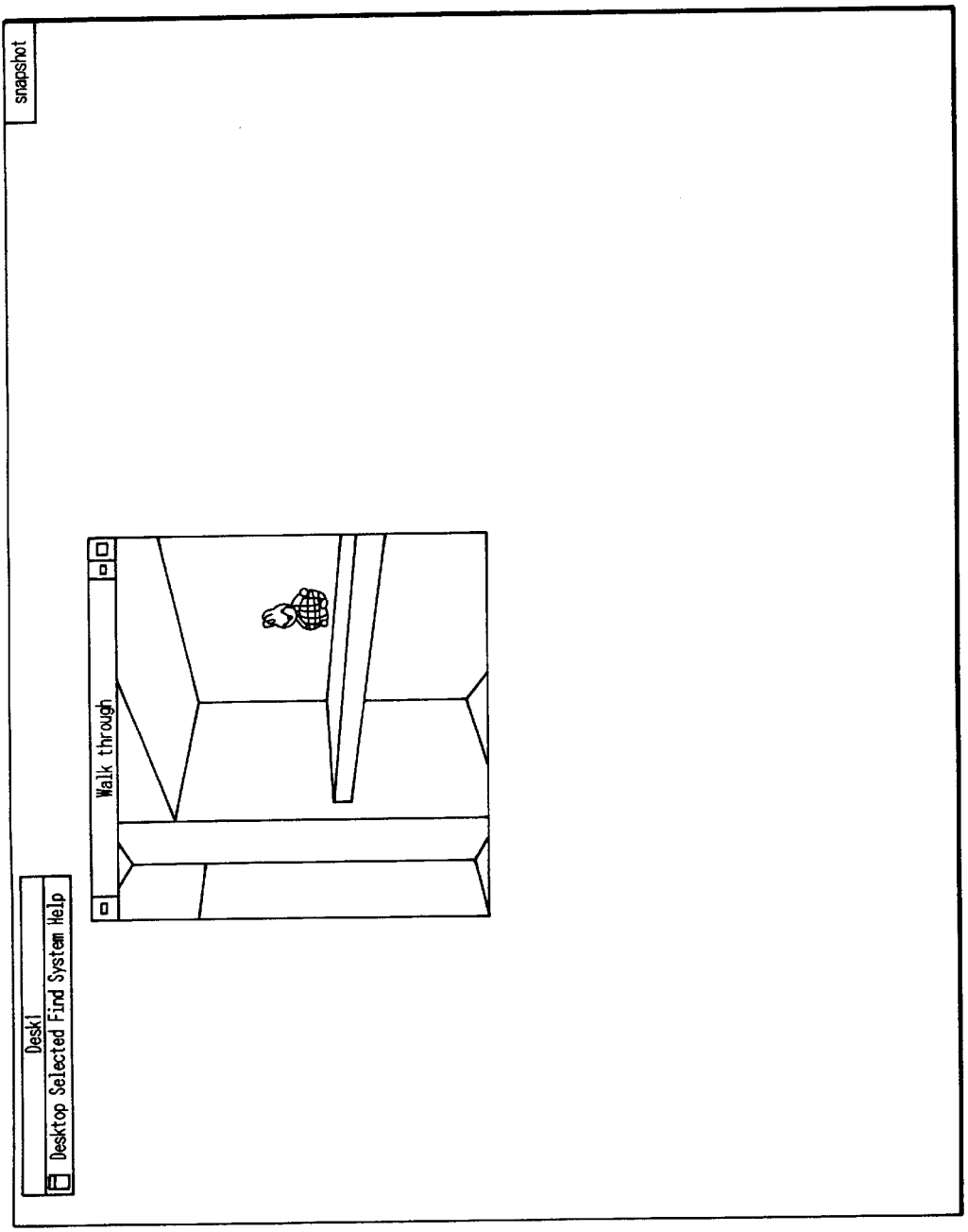
FIG. 8 is a view showing an example of the screen image actually generated according to the first embodiment.

Furthermore, in step S207, the drawing specification of the shape model data d1 is calculated based on the angle of view of the virtual camera and the position and direction of the viewer in the virtual space upon viewing by the initialized screen size in accordance with the shape model drawing routine p41 in the processing procedure storage device 2, and a view image is generated based on the shape model data. The generated image is written in the frame buffer 4 in step S208, and is displayed on a screen 5. FIG. 8 shows this display example.

Figure 9:
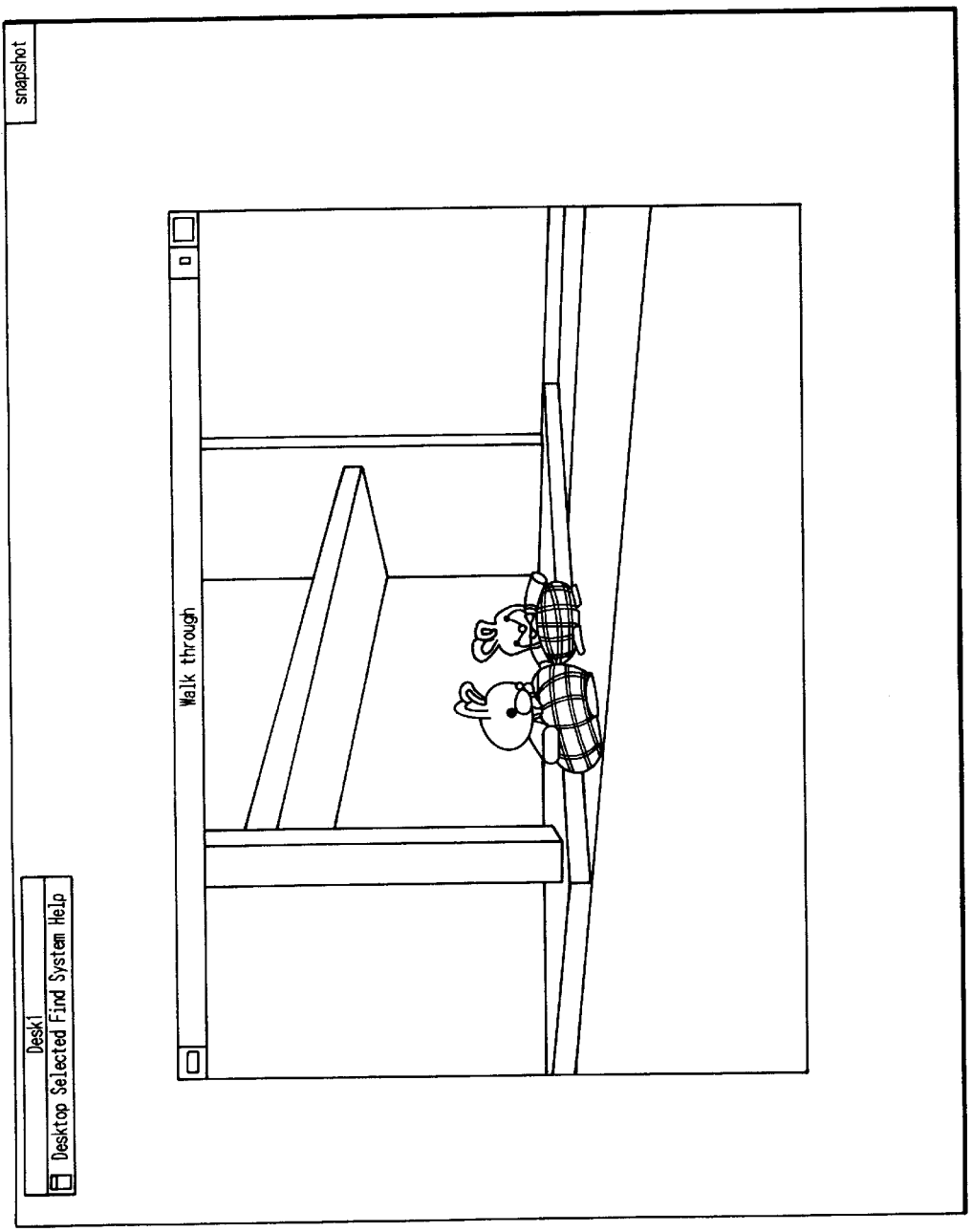
FIG. 9 is a view showing an example of the screen image actually generated according to the first embodiment.

Moreover, in step S209, the distance between each light space data d3 and the viewpoint position is calculated based on the arrangement data d4. In step S2095, the order of processing of the light space data d3 to be processed in steps S210 to S213 to be described below is determined on the basis of the distances calculated in step S209. For example, in this case, the processing order from light space data d3 with larger distances is determined. In step S210, it is checked if processing is complete for all the light space data d3. If YES in step S210, the flow advances to step S214; otherwise, the flow advances to step S211. In step S211, it is checked if an image is to be generated based on the light space data d3 of interest of the arrangement data d4. For example, if the viewpoint position and direction fall within the view range included in the arrangement data d4, as shown in FIG. 9, it is determined in step S211 that an image is to be generated, and the flow advances to step S212; otherwise, it is determined in step S211 that an image is not to be generated, and the flow returns to step S210. In step S212, a drawing specification (which allows generation of the same view image as that drawn based on the shape model data in step S207) required for generating a view image from the light space data d3 of interest is calculated in accordance with the drawing specification acquisition routine p42 stored in the processing procedure storage device 2, and an image is generated from the light space data d3 of interest in accordance with the image generation routine p43 from light space data d3. The generated image is overwritten on the frame buffer 4 and is displayed on the screen 5, in step S213.

If the processing in steps S210 to S213 is complete for all the light space data d3, the flow advances from step S210 to step S214.

Figure 10:
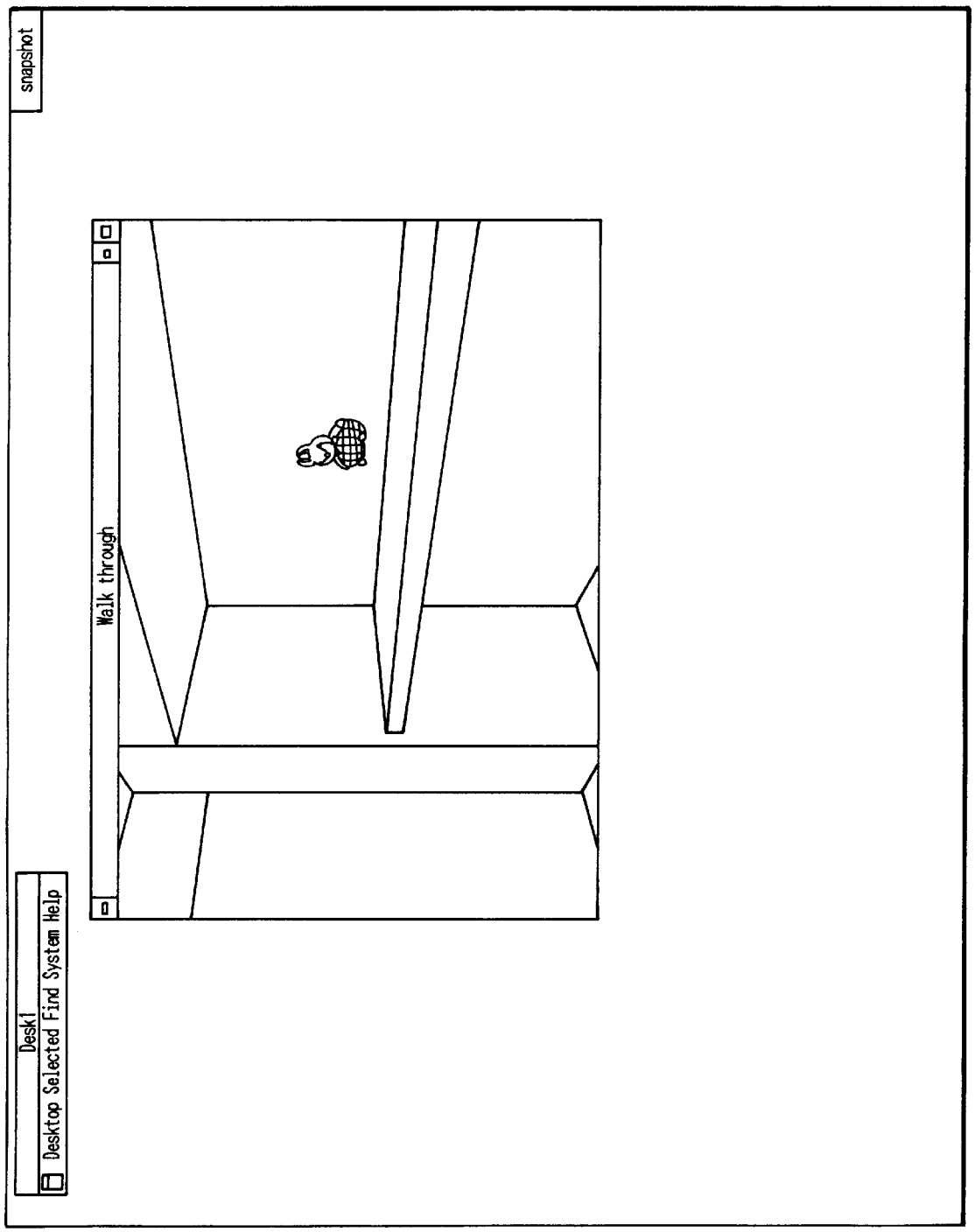
FIG. 10 is a view showing an example of the screen image actually generated according to the first embodiment.

In step S214, it is checked if establishment of the view screen is to be changed. If YES in step S214, the flow advances to step S218, and the angle of view ratio and the window size are changed by broadening the window frame using a mouse. Thereafter, the flow returns to step S207, and for example, the display example shown in FIG. 8 is changed in step S208, as shown in FIG. 10. If establishment of the view screen is not to be changed, the flow advances to step S215.

Figure 11:
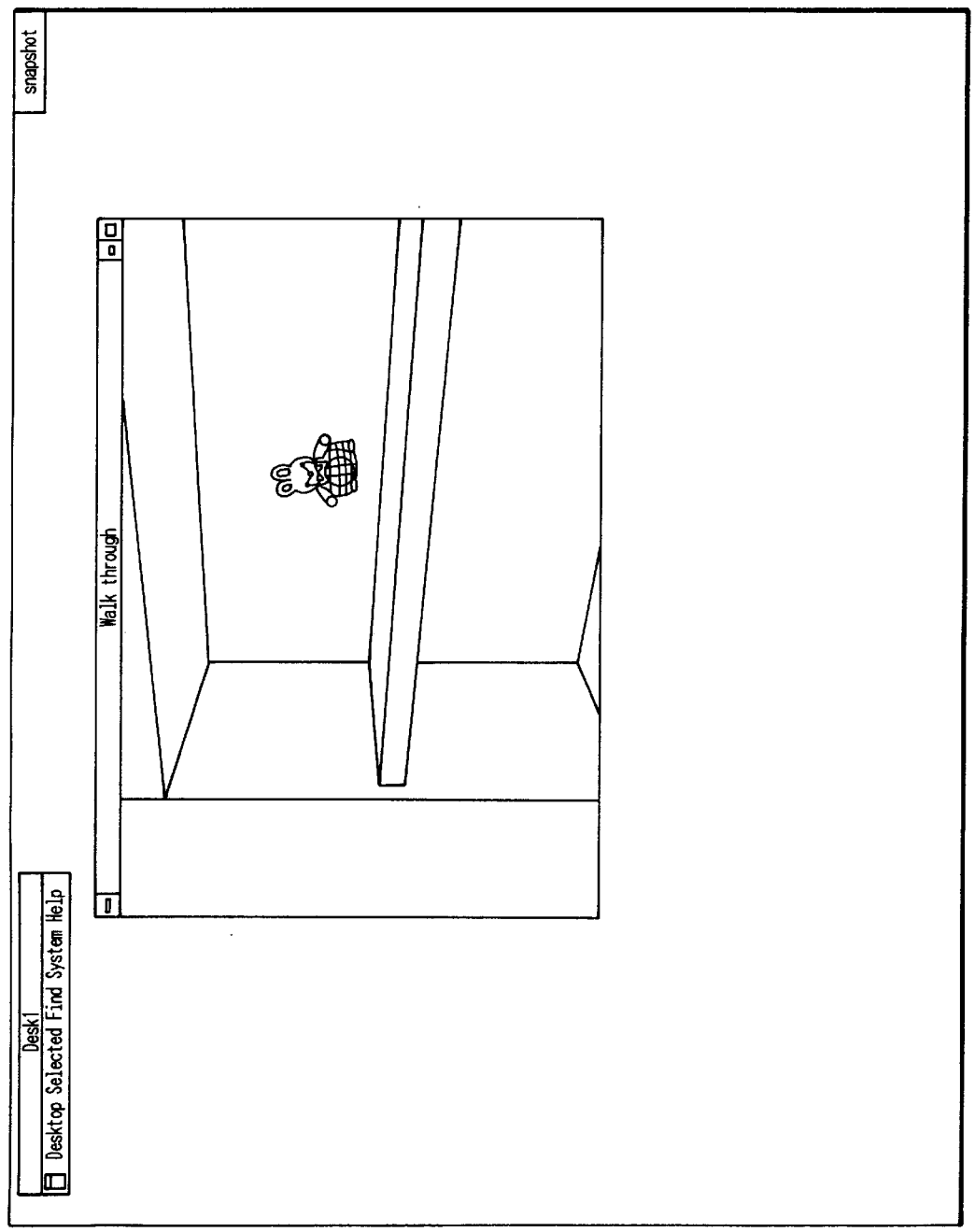
FIG. 11 is a view showing an example of the screen image actually generated according to the first embodiment.

It is checked in step S215 if the viewpoint position and direction are to be changed. If YES in step S215, the flow advances to step S219, and the viewpoint position and direction are changed by performing forward and backward movements, clockwise and counterclockwise turns, right and left movements, right and left looking, and the like using switches assigned to, e.g., arrow keys while the window is being selected as the object to be controlled. Thereafter, the flow returns to step S207, and for example, the display example shown in FIG. 10 is changed in step S208, as shown in FIG. 11. If the viewpoint position and direction are not changed, the flow advances to step S216.

Figure 12:
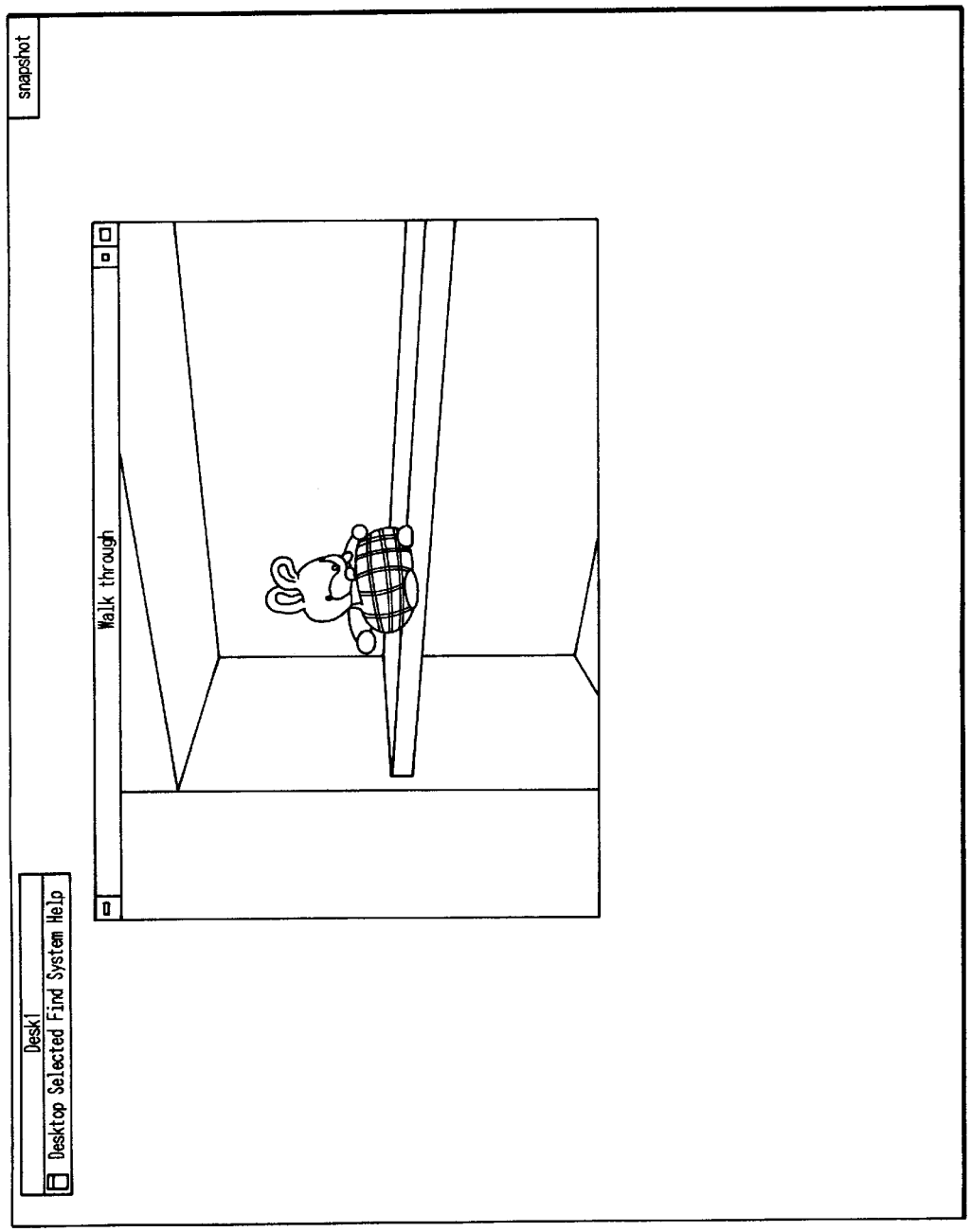
FIG. 12 is a view showing an example of the screen image actually generated according to the first embodiment.

In step S216, it is checked if the arrangement data d4 of light space data is to be changed. If YES in step S216, the flow advances to step S220, and the arrangement data d4 is changed by operating only the object expressed by the light space using switches assigned to, e.g., arrow keys as in step S219. Thereafter, the flow returns to step S207, and for example, the display example shown in FIG. 11 is changed in step S208, as shown in FIG. 12. If the arrangement data d4 of light space data is not to be changed, the flow advances to step S217.

These steps S214, S215, and S216 are attained by the walk through control routine p3 in the processing procedure storage device 2. In step S217, the control waits for an input indicating processing end. If an input indicating processing end is made, the processing ends; otherwise, the flow returns to step S214.

Note that it is checked based on the position and direction of the arrangement data of the individual light space data d3 if the object expressed by the light space data d3 can be viewed from the position and direction of the viewer. If it is determined that the object can be viewed, the flow advances to step S209; otherwise, the flow advances to step S211.

With the above-mentioned steps, a three-dimensional space is generated using shape model data d1, a space is reconstructed as an image from the three-dimensional space in accordance with a drawing specification at a given viewpoint, an image is generated from light space data d3 in accordance with a drawing specification that allows the same view as the former drawing specification, and these images are fused, thereby generating a virtual environment for virtual reality and allowing the viewer to experience it.

FIG. 9 or 12 shows a space actually generated by the first embodiment and an example of its view image. The geometric shape in the room and its surface pattern are expressed by the shape model, a rabbit doll is expressed by the light space, and the image shown in FIG. 9 or 12 is generated based on these images by the method of this embodiment.

In the first embodiment, two steps, i.e., step S202 of inputting multi-viewpoint image data and step S203 of generating light space data may be replaced by one step of reading light space data generated in advance.

(b) Second Embodiment

In the first embodiment, as the actually taken image-based image generation processing, a view image is generated from light space data d3 in step S212. Alternatively, in the second embodiment, an image required for display is generated from multi-viewpoint image data in place of the light space data d3 by the following method.

Figure 13:
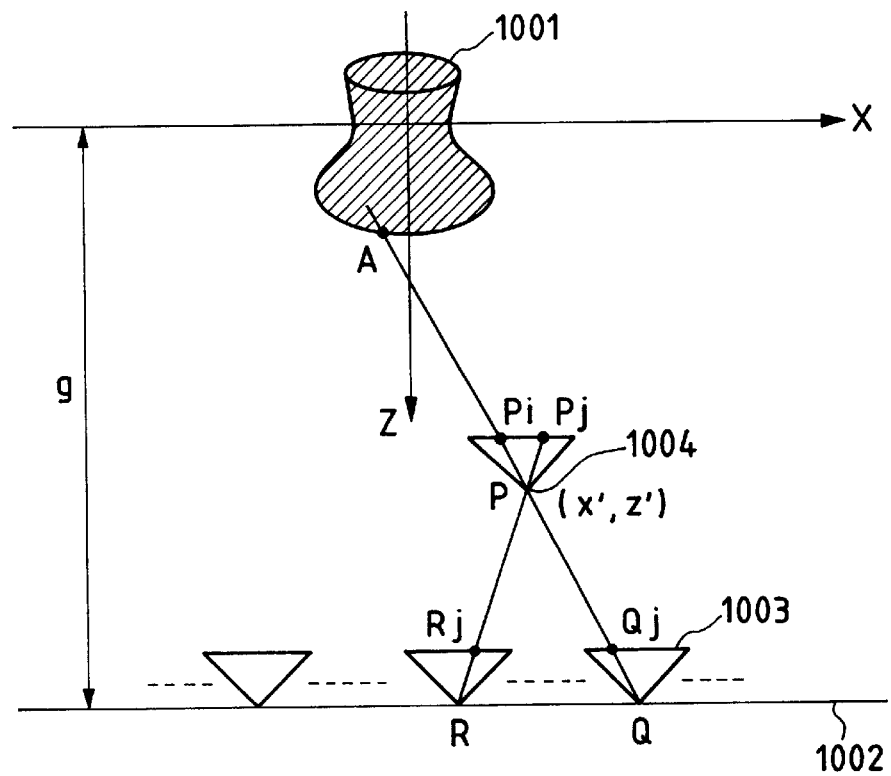
FIG. 13 is a view showing the principle of generating an image based on multi-viewpoint images used in the second embodiment.

FIG. 13 shows the principle of reconstructing an image from input multi-viewpoint image data. As shown in FIG.

13, as the conditions for phototaking multi-viewpoint images in the second embodiment, images must be taken by aligning cameras on a straight line perpendicular to the phototaking direction. FIG. 13 illustrates an object 1001, a line 1002 with projection viewpoints, which line connects the phototaking positions of input images, a virtual CCD surface 1003 of a virtual camera, and a virtual camera 1004 set at the position (x', z') of the viewer.

Figure 14:
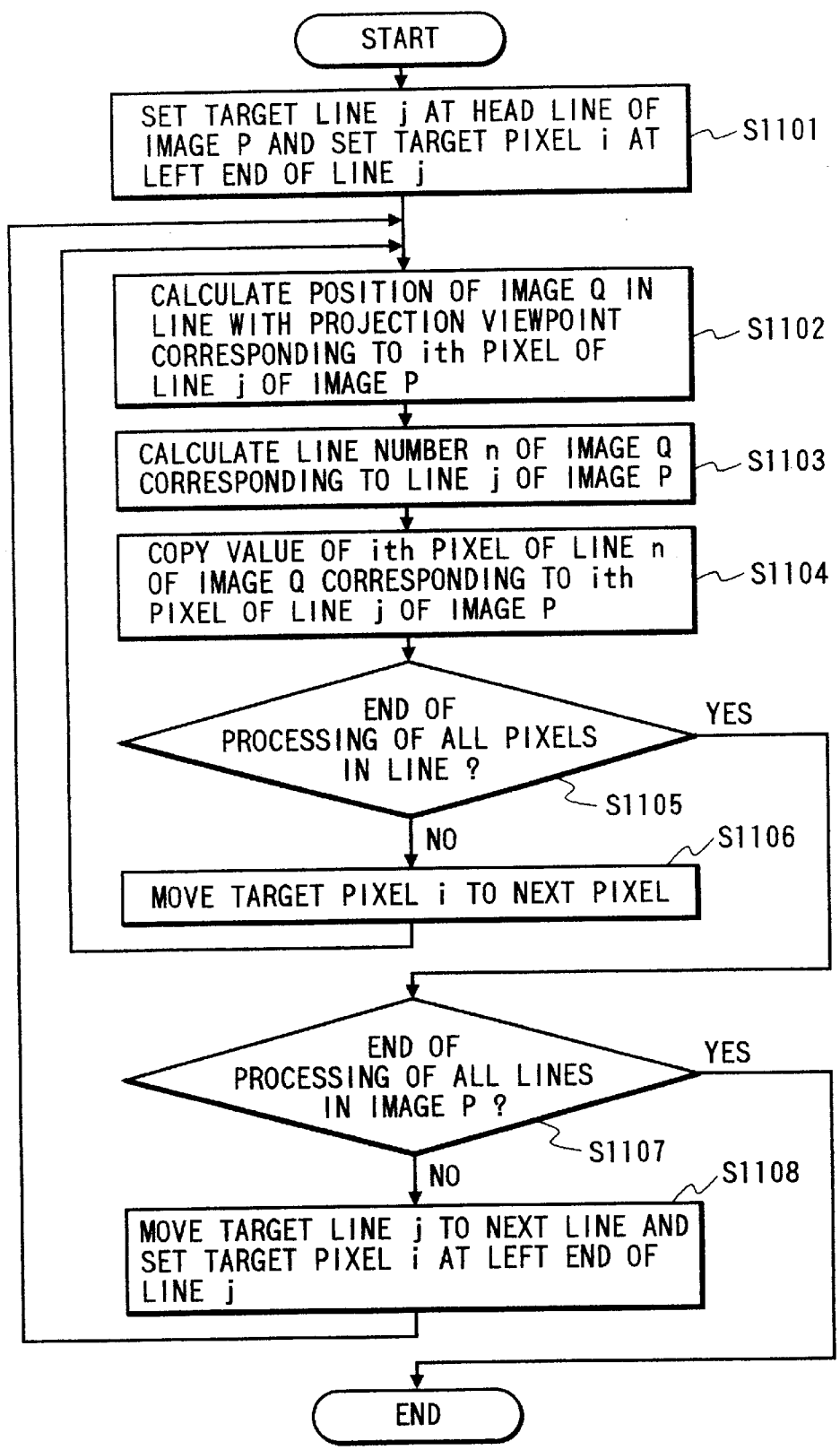
FIG. 14 is a flow chart showing image generation based on multi-viewpoint images used in the second embodiment.

The processing for generating an image from multi-viewpoint images will be explained below with reference to the flow chart in FIG. 14. In step S1101, a target line j is set at the head line of an image P, and a target pixel i is set at the pixel at the end of the line j. In step S1102, the position of an image Q in the line 1002 with projection viewpoints corresponding to the i-th pixel of the line j of the pixel p is calculated. This position can be calculated as follows. Assume that a certain point A is imaged at a pixel position Pi of the virtual camera at the viewpoint position P. Also, assume that Q represents the intersection between a line connecting the positions A and P, and the line 1002 with projection viewpoints. At this time, as can be seen from FIGS. 3A and 3B, an object imaged at the pixel position Pi is equivalent to that imaged at a pixel position Qi of the image taken at the viewpoint position Q. From the geometric limit condition in FIGS. 3A and 3B, the x-coordinate of the viewpoint position Q can be expressed by equation (3) below. In this case, the central pixel position of the scan line is assumed to be the 0th pixel.

$$x = x' + i \cdot d \cdot (g - z')/f \quad (3)$$

where d is the pixel pitch of the virtual camera 1004, f is the focal length, and g is the distance from the origin to the line 1002 with projection viewpoints.

Similarly, an object imaged at a pixel position Pj of the virtual camera at the viewpoint position P is equivalent to that imaged at a pixel position Rj of an image at a viewpoint position R stored in the data storage device 3.

With this method, for example, when an image is reconstructed by copying the i-th pixel value of the line j of the image Q to the i-th pixel of the line j of the image P, the reconstructed image is often distorted, i.e., the object in the image vertically stretches or shrinks. In order to solve this problem, in step S1103, the line number n of the image Q corresponding to the line j of the image P is calculated. The method of calculating the line number n of the image Q will be described below with reference to FIG. 15.

Figure 15:
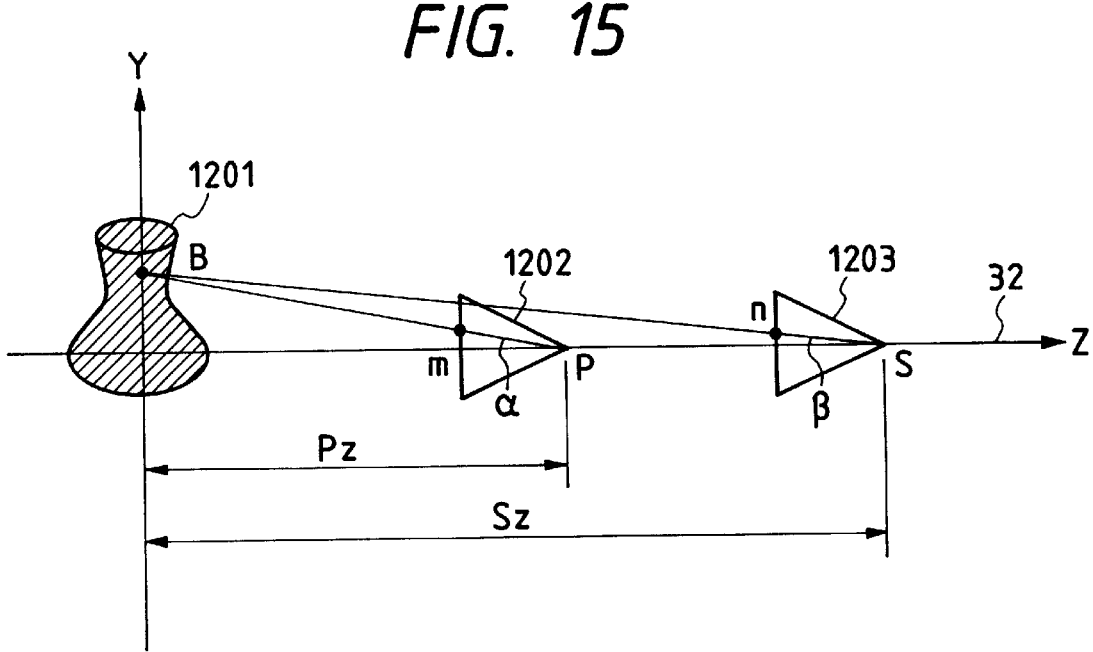
FIG. 15 is a view showing the principle of distortion correction in the vertical direction in the image generation of the second embodiment.

FIG. 15 shows the principle of correcting distortion of the image reconstructed by the above-mentioned method. FIG. 15 illustrates an object 1201, an image 1202 to be reconstructed at the viewpoint position P, and an image 1203 at the viewpoint position S on the line 1002 with projection viewpoints.

A given point B in the object 1201 will be examined. Assume that the point B is close to the y-axis, the z-coordinate values of the image 1202 to be reconstructed at the viewpoint position P and the image 1203 at the viewpoint position S on the line 1002 with projection viewpoints are sufficiently large, or the z-coordinate value Pz of the image 1202 to be reconstructed at the viewpoint position P is nearly equal to the z-coordinate value Sz of the image 1203 at the viewpoint position S on the line 1002 with projection viewpoints. At this time, light rays coming from the point B are recorded on the m-th line in the image 1202 to be reconstructed at the viewpoint position P, and the n-th line in the image 1203 at the viewpoint position S on the line 1002 with projection viewpoints. If d represents the pixel pitches of the virtual CCD 1003, f represents the focal length of the virtual camera 1004, and N represents the number of lines of the virtual CCD 1003, we have:

$$Pz \cdot \tan \alpha = Sz \cdot \tan \beta \quad (4)$$

$$\tan \alpha = d \cdot (N/2 - m)/f \quad (5)$$

$$\tan \beta = d \cdot (N/2 - n)/f \quad (6)$$

From equations (4), (5), and (6):

$$n = N/2 + (m - N/2) \cdot Sz/Pz \quad (7)$$

Accordingly, the value of the m-th scan line of the image 1202 to be reconstructed at the viewpoint position P is equivalent to that of the n-th scan line, given by equation (7), of the image 1203 at the viewpoint position S on the line 1002 with projection viewpoints. Thus, in step S1104, the value of the i-th pixel of the line n of the image Q is copied to the i-th pixel of the line j of the image P. With this processing, image distortion upon reconstructing the image at the viewpoint position, which is not on the line 1002 with projection viewpoints can be suppressed to some extent. Thereafter, the flow advances to step S1105 to check if processing for all the pixels in the target line j is complete. If YES in step S1105, the flow advances to step S1107; otherwise, the flow advances to step S1106. In step S1106, the target pixel i is moved to the right neighboring pixel, and the flow returns to step S1102. In step S1107, it is checked if the processing for all the lines in the image P is complete. If YES in step S1107, this subroutine ends; otherwise, the target line j is moved to the next line and the target pixel i is set at the left end of the line j in step S1108. Thereafter, the flow returns to step S1102.

In this manner, if multi-viewpoint images taken at very small intervals on the line 1002 with projection viewpoints are obtained, the same processing based on the above-mentioned principle is repeated for all the scan lines, thereby reconstructing an image at the viewpoint position which is not on the line 1002 with projection viewpoints.

(c) Third Embodiment

Figure 16:
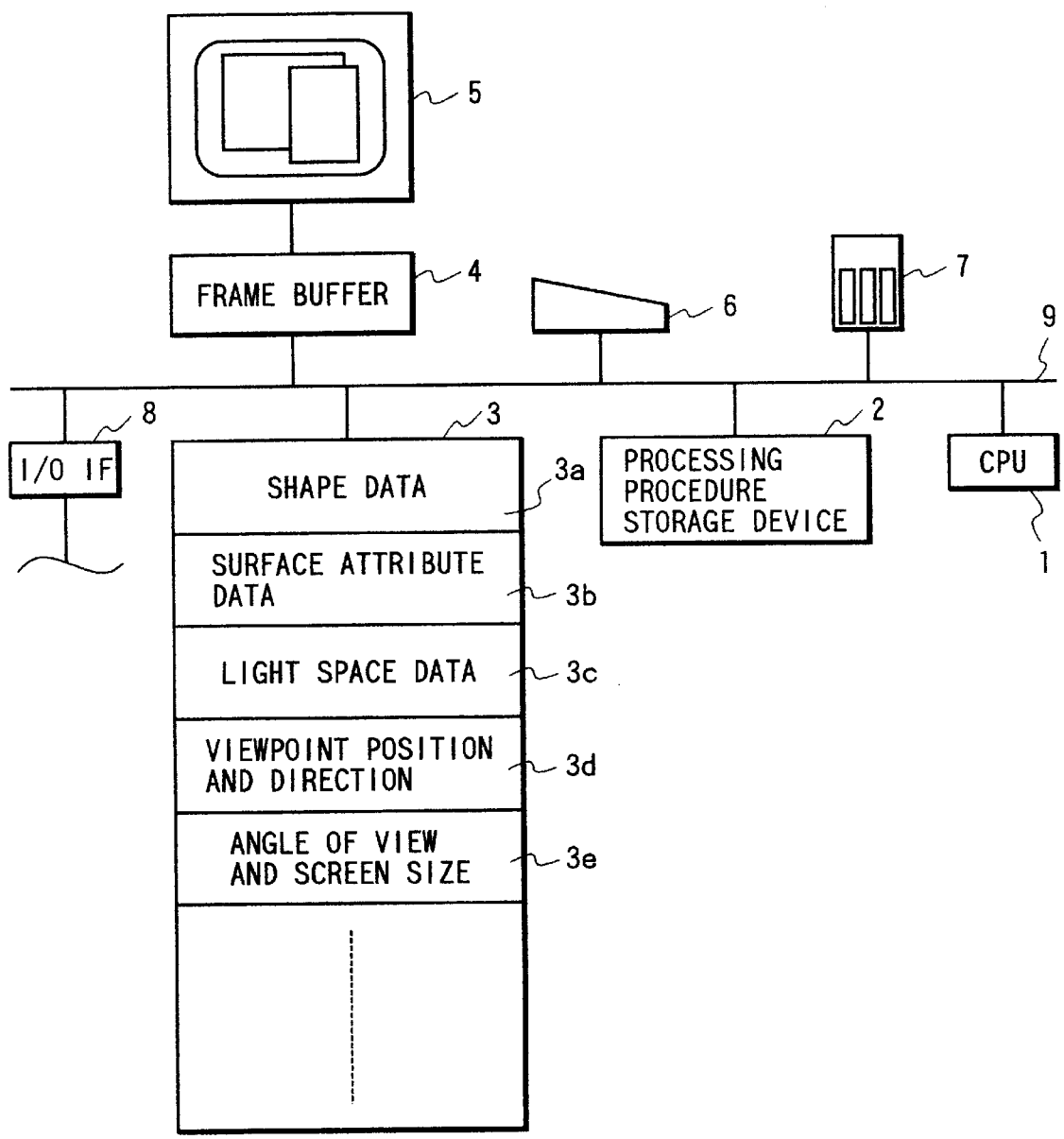
FIG. 16 is a block diagram showing the third embodiment of the present invention.

FIG. 16 is a block diagram showing the connections among the individual units of an image processing apparatus according to the third embodiment.

The difference from FIG. 1 is that the data storage device 3 includes shape data 3a, surface attribute data 3b (which is the same as the surface attribute data d12 in FIG. 1), light space data 3c (which is the same as the light space data d3 in FIG. 1), a viewpoint position and direction 3d, and an angle of view and screen size 3e.

Figure 17A:
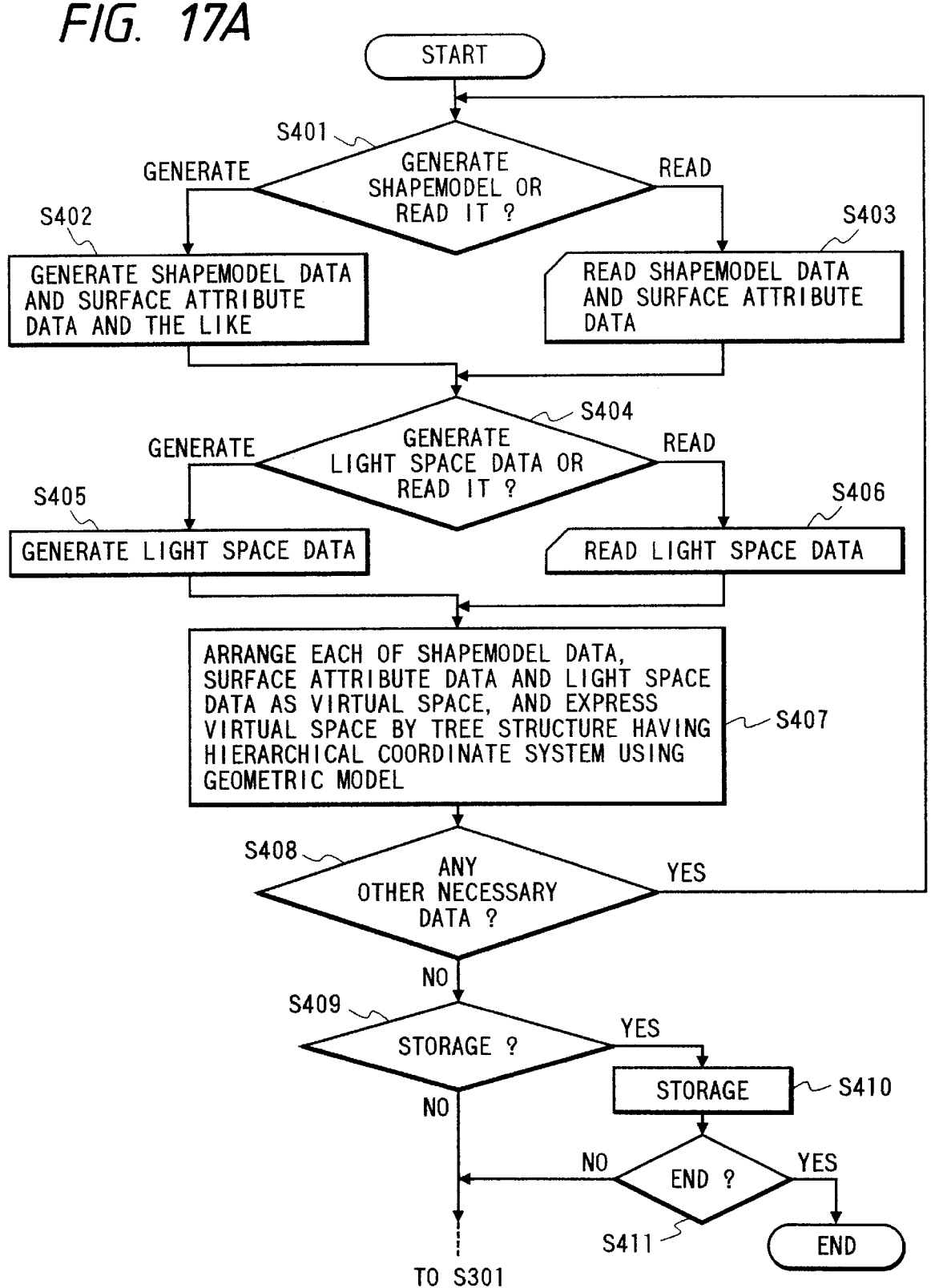
FIGS. 17A and 17B are flow charts of the third embodiment.
Figure 17B:
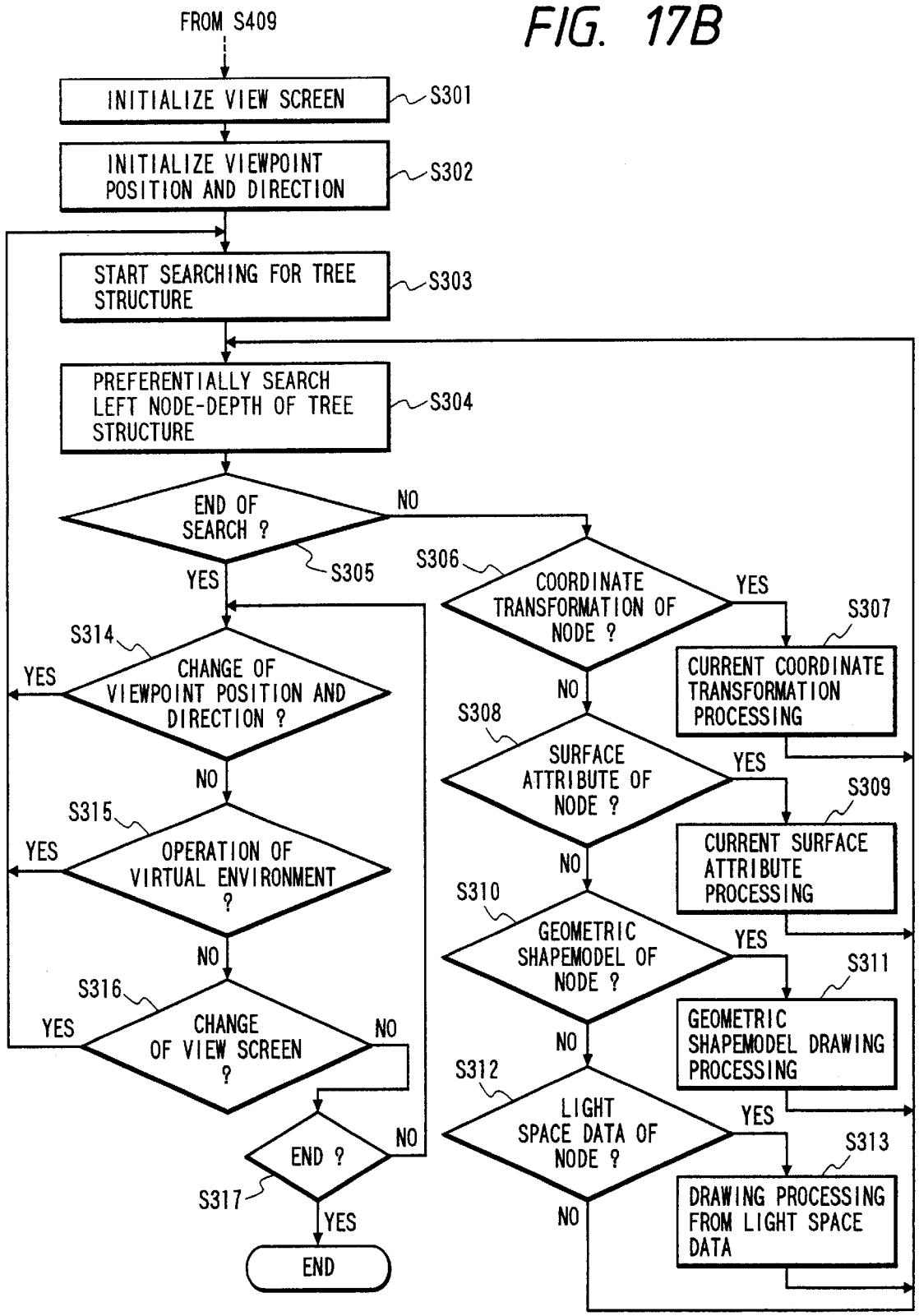
Figure 18:
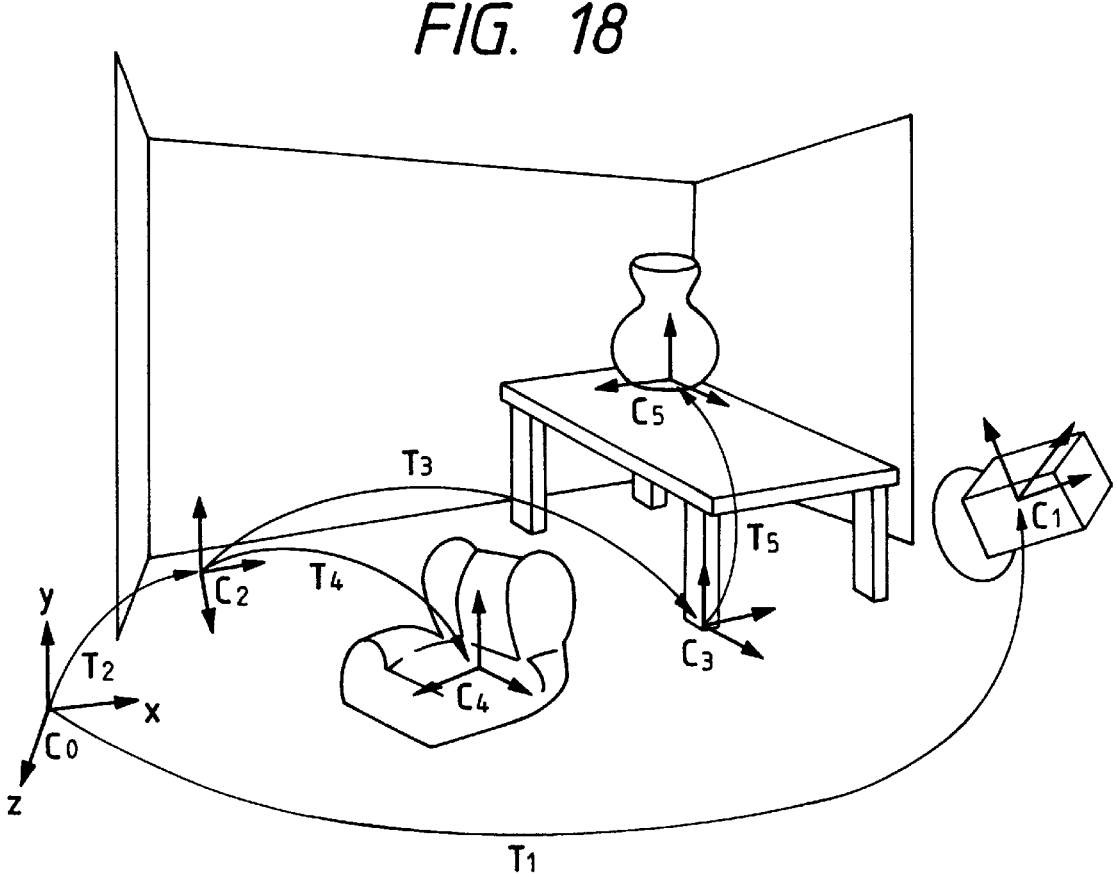
FIG. 18 is a view showing an illustration example of a virtual environment built by the conventional method (2)
Figure 19:
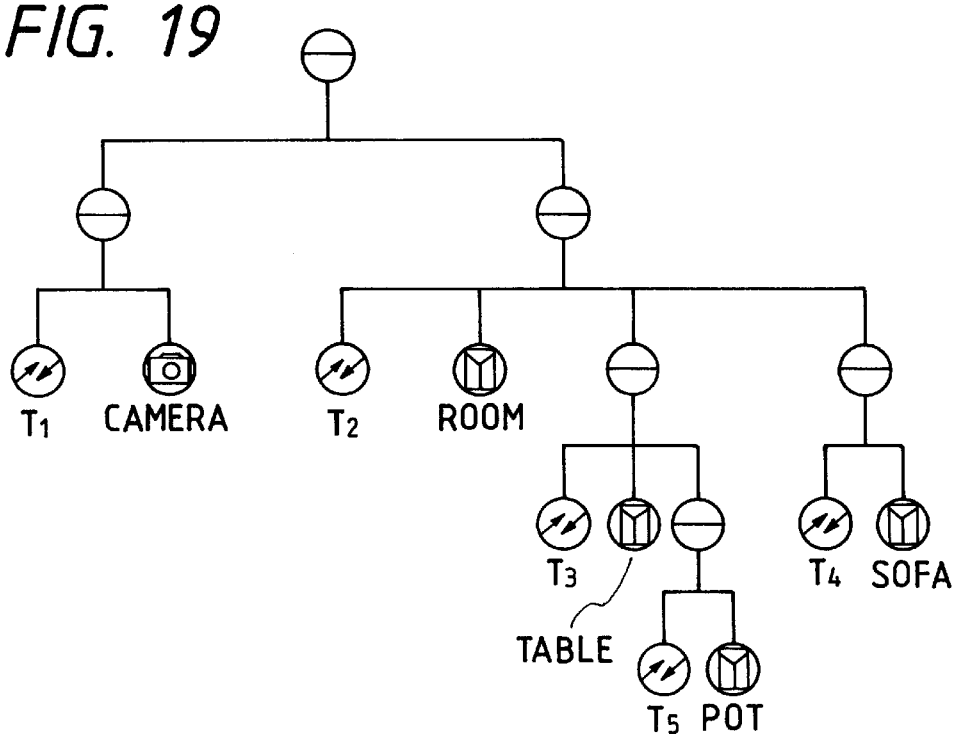
FIG. 19 is a view that expresses the virtual environment shown in FIG. 18 by a tree structure.

FIGS. 17A and 17B are flow charts showing the flow of the processing of the third embodiment. The third embodiment will be described in detail below with reference to FIGS. 17A and 17B. In order to generate a virtual environment using geometric models, internal objects, architectures, and background that make up the virtual environment need be created using, e.g., a modeler apparatus which can create geometric shape data of some computer graphics and their surface attribute data.

The existing technique can be used in this generation processing. In step S401, it is selected whether a geometric shape model 3a and its surface attribute data 3b are to be generated during this processing or data separately generated by another processing are to be read. If the geometric shape model 3a and its surface attribute data 3b are to be generated during this processing, they are generated in step S402; otherwise, data generated by another generation apparatus are read in step S403. Note that the shape data includes polygon data such as triangle patches, free curved surface data such as NURBS, and the like. The surface attribute data represents the material, reflection characteristics, pattern, and the like of the shape, and the pattern is input as texture data. The texture data is one representing the surface pattern of polygon data, free curved surface data, or the like, and describes image data of the pattern and the positional relationship between the image and the shape to which the image is to be adhered.

In step S404, it is selected whether light space data 3c to be arranged in the virtual environment is to be generated or light space data 3c generated in advance is to be read. If the data is to be generated, it is generated in step S405; otherwise, it is read in step S406.

The method of generating the light space data 3c in step S405 has already been described in the paragraphs of the first embodiment.

The operation after the processing in step S405 or S406 is completed will be explained.

In step S407, a three-dimensional world is built by arranging the generated data. Upon expressing the virtual environment, elements (coordinate transformation data, shape data, surface attribute data, illumination, and the like) that make up the virtual environment are expressed by a tree structure as in the conventional method (2). That is, a space, ground, architecture, room, furniture, illumination, ornament, and the like that make up the three-dimensional space originally have a hierarchical nesting relationship thereamong. For example, an ornament on a table depends on the table arrangement so that it moves together with the table arrangement, and it is often convenient to arrange such ornament relative to the coordinate system of the table. For this reason, a data structure having hierarchical dependence on the arrangement is used. As a method of expressing such structure, a virtual environment is expressed by an n-ary tree structure.

Figure 20:
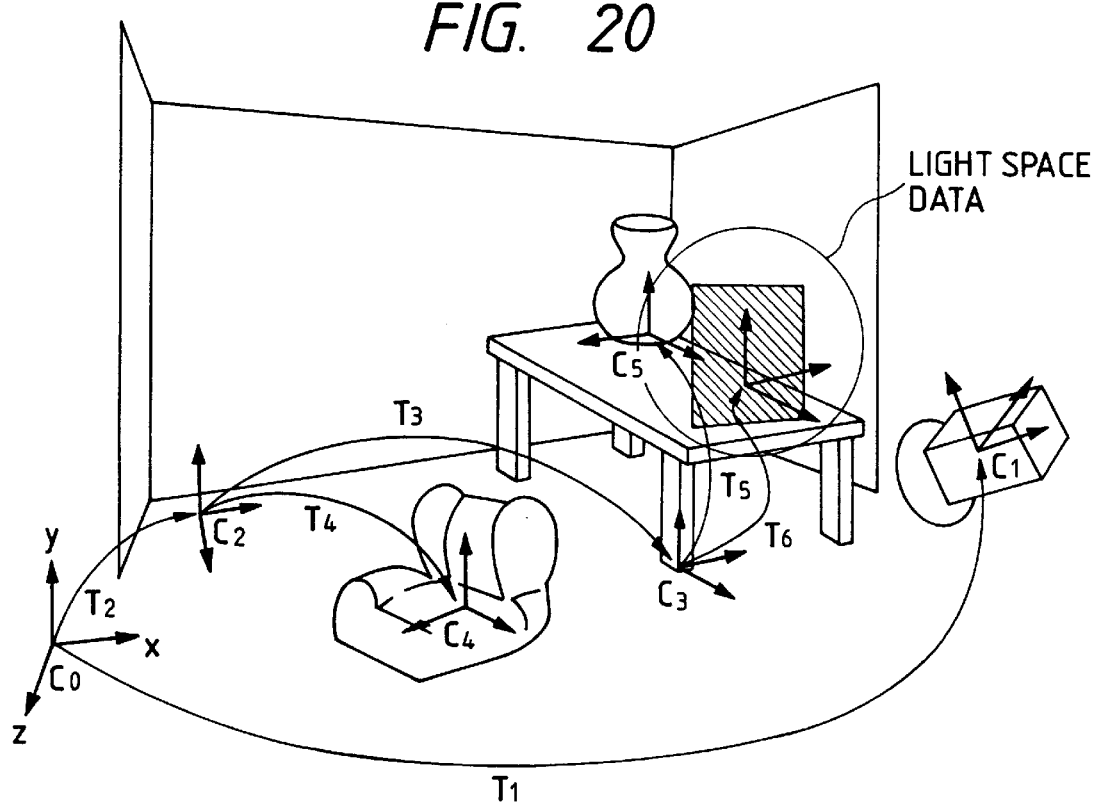
FIG. 20 is a view showing an illustration example of a virtual environment generated by the third embodiment.

FIG. 20 shows an illustration example of a certain simple virtual environment. In the case of this figure, paying attention to a room, table, and sofa in the space, the room is described on a coordinate system $C_2$ transformed from a world coordinate system $C_0$ by a coordinate transformation $T_2$, and the table and sofa in the room are respectively described on coordinate systems $C_3$ and $C_4$ transformed from the coordinate system $C_2$ by coordinate transformations $T_3$ and $T_4$. A pot on the table is described on a coordinate system $C_5$ transformed from the coordinate system $C_3$ by a coordinate transformation $T_5$. Unlike in the conventional method (2), in the method of this embodiment, the light space data generated in step S403 or read in step S404 also expresses data as one element of this tree structure. In the case of FIG. 20, the light space data is arranged on the table. This data is described on a coordinate system $C_6$ transformed from the coordinate system $C_3$ by coordinate transformation $T_6$. In the existing technique, unrelated data such as light space data which is different from the shape data cannot be described together. However, in the method of this embodiment, the light space data is described as one element of the tree structure as in the shape data. With this method, an object having a complex shape is described using light space data, and simple data such as a room, a row of stores and houses, or the like is described using shape models, thus allowing the description of the three-dimensional space by utilizing the features of the two different types of data.

Figure 21:
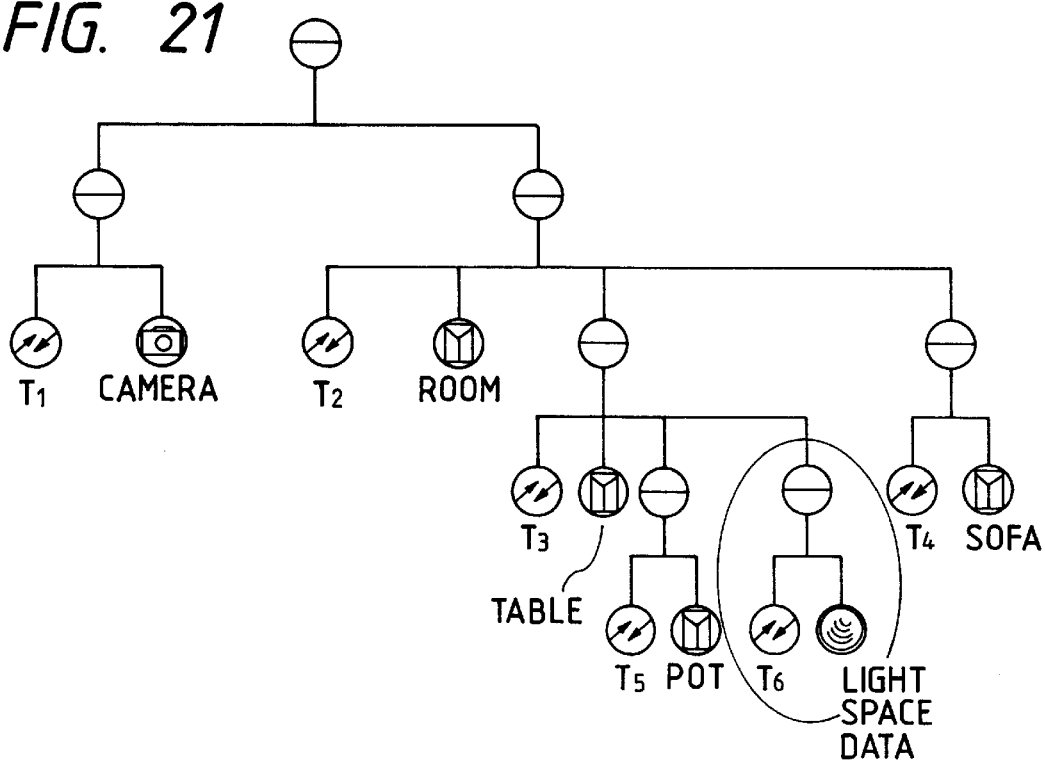
FIG. 21 is a view that expresses the virtual environment shown in FIG. 20 by a tree structure.

When the virtual environment shown in FIG. 20 is expressed by a typical tree structure, a tree shown in FIG. 21 is obtained. When the tree is expressed by text data for the purpose of recording this tree structure data, the data format shown in FIG. 22 is obtained. In FIG. 22, "Separator" represents the head of a partial tree, and "Transform" represents a coordinate transformation. Note that keywords "Separator", "Transform", and the like are not limited to these specific ones as long as they can be distinguished from each other. Also, divisions using "{"and"}" may be replaced by other symbols or character strings. In this way, the light space data is described as one element that builds the tree structure.

The operation after the processing in step S407 is completed will be described below.

When data necessary for building the virtual environment remain ungenerated or unread, it is determined in step S408 that the control is to return to the pre-processing, and the flow returns to step S401. Otherwise, the flow advances to step S409 to check if the currently generated virtual environment data are to be stored. If YES in step S409, the data are stored in step S410; otherwise, the flow advances to step S301. When the data are stored in step S410, it is checked in step S411 if the processing is to end. If YES in step S411, the processing ends; otherwise, the flow also advances to step S301.

A method of presenting the virtual environment expressed by the tree structure by the above-mentioned method will be described in detail below.

When a viewer views the virtual environment, the view image of the virtual environment from the viewpoint position must be drawn on the display screen. By tracing all the nodes of the n-ary tree shown in FIG. 21 by left node-depth preferential searching, the data of all the nodes that build this tree are accessed. At this time, data is sequentially drawn on the display screen at the time of access to each node on the basis of information written in the node. The basic method has been described.

In step S301, the view screen is initialized. In step S302, the view point position and direction 3d are initialized. Subsequently, the flow advances to step S303 to start searching of the tree structure. In this case, the left node-depth preferential searching method is used (step S304). The searching for nodes is continued until this searching ends (step S305).

If the contents of the current node indicate a coordinate transformation (step S306), the flow advances to step S307 to execute current coordinate transformation processing. If no nodes corresponding to coordinate transformations are found so far, the coordinate transformation of the found node is set to be a current coordinate transformation as the basic coordinate transformation of a partial tree deeper than the node; otherwise, the existing current coordinate transformation is multiplied by the coordinate transformation of the newly found node to update the current coordinate transformation for the partial tree deeper than the found node. Upon searching in the depth direction, the tree gives a current coordinate transformation to the next depth by passing the existing current coordinate transformation. If there are no more deeper nodes, and the searching advances to a new shallower node, the current coordinate transformation which is to be updated by the next deeper node is not passed to the shallower node. In this case, the current coordinate transformation which was found by previous searching for the node of the tree at that depth is used.

If NO in step S306, the flow advances to step S308. If it is determined in step S308 that the contents of the node indicate a surface attribute, the flow advances to step S309 to execute current surface attribute processing. When the node appears, the surface attribute of the node is set to be a current surface attribute as the basic surface attribute of a partial tree deeper than the node. Upon searching the tree in the deeper direction, the current surface attribute is given to the next deeper node by passing the existing current surface attribute. If there are no more deeper nodes, and the searching advances to a new shallower node, the current surface attribute, which is to be updated by the next deeper node, is not passed to the shallower node. In this case, the current surface attribute which was found by previous searching for the node of the tree at that depth is used.

If NO in step S308, the flow advances to step S310. If it is determined in step S310 that the contents of the node indicate a geometric surface mode, the flow advances to step S311 to execute geometric shape model drawing processing. In this processing, the coordinate transformation of the position, direction, and scaling of the shape model is performed using the current coordinate transformation, and a display image is drawn on the screen to be presented to the viewer as a two-dimensional image by the conventional method (1) using the current surface attribute. At this time, a depth value storage map corresponding to the individual pixels of the presentation screen is prepared. Upon drawing a shape model in the drawing processing, the depth values of three-dimensional positions on the surface of the shape model at positions corresponding to the individual pixels on the screen viewed from the viewpoint position are written in the corresponding pixels in the depth value storage map. In this case, if the depth values have already been written in the depth value storage map by this processing, when a depth value obtained for drawing a new image is larger than the already stored depth value, the value is not written in this pixel and the depth value storage map is not rewritten.

If NO in step S310, the flow advances to step S312. If it is determined in step S312 that the contents of the node indicate light space data, the flow advances to step S313 to execute drawing processing from light space data. In this processing, the coordinate transformation of the position, direction, scaling, and the like of light space data is performed using the current coordinate transformation. The position and direction, viewed from the reference plane of the light space data, of the viewpoint position are calculated. A drawing specification used for generating an image to be generated from the light space data under the view conditions is determined on the basis of the calculation results and the like, and an image to be displayed on the presentation screen is generated. At this time, as in the drawing processing from the geometric shape model, depth discrimination in units of pixels on the display screen is performed. The distance between the viewpoint position and the position, on the reference plane, of each pixel of the light space data is used as the depth value of the pixel of the light space data, and this value is compared with a corresponding depth value stored in the depth value storage map. If the value of the pixel of interest is smaller than the corresponding value in the depth value storage map, the value of the pixel of the image generated from the light space data is overwritten on the value in the map, thereby updating the depth value storage map. Otherwise, the map is not updated.

Upon completion of the processing in steps S307, S309, S311, and S313, the flow returns to step S304 as the beginning of the tree searching processing.

If it is determined in step S305 that tree searching has ended, viewing in the initial state is complete with the above-mentioned processing. Thereafter, it is checked in step S314 if the viewpoint position and direction 3d are to be changed. If the viewer wants to walk through the virtual environment, since he or she changes the viewpoint position and direction 3d in this step, the flow returns to step S303.

If the viewpoint position and direction 3d are not changed, the flow advances to step S315 to check if the operation processing of the virtual environment is to be performed. This processing corresponds to, e.g., an operation for moving an object in the virtual environment. If this processing is to be performed, the flow returns to step S303; otherwise, the flow advances to step S316. It is checked in step S316 if processing for changing the view screen such as the angle of view, screen size 3e, and the like is to be performed. If this processing is to be performed, the flow returns to step S303; otherwise, the flow advances to step S317. It is checked in step S317 if all the processing operations are to end. If the processing is not to end, the flow returns to step S314. If some change instruction is input in step S314, S315, or S316, the flow returns to step S303 to execute the drawing processing again.

Figure 23:
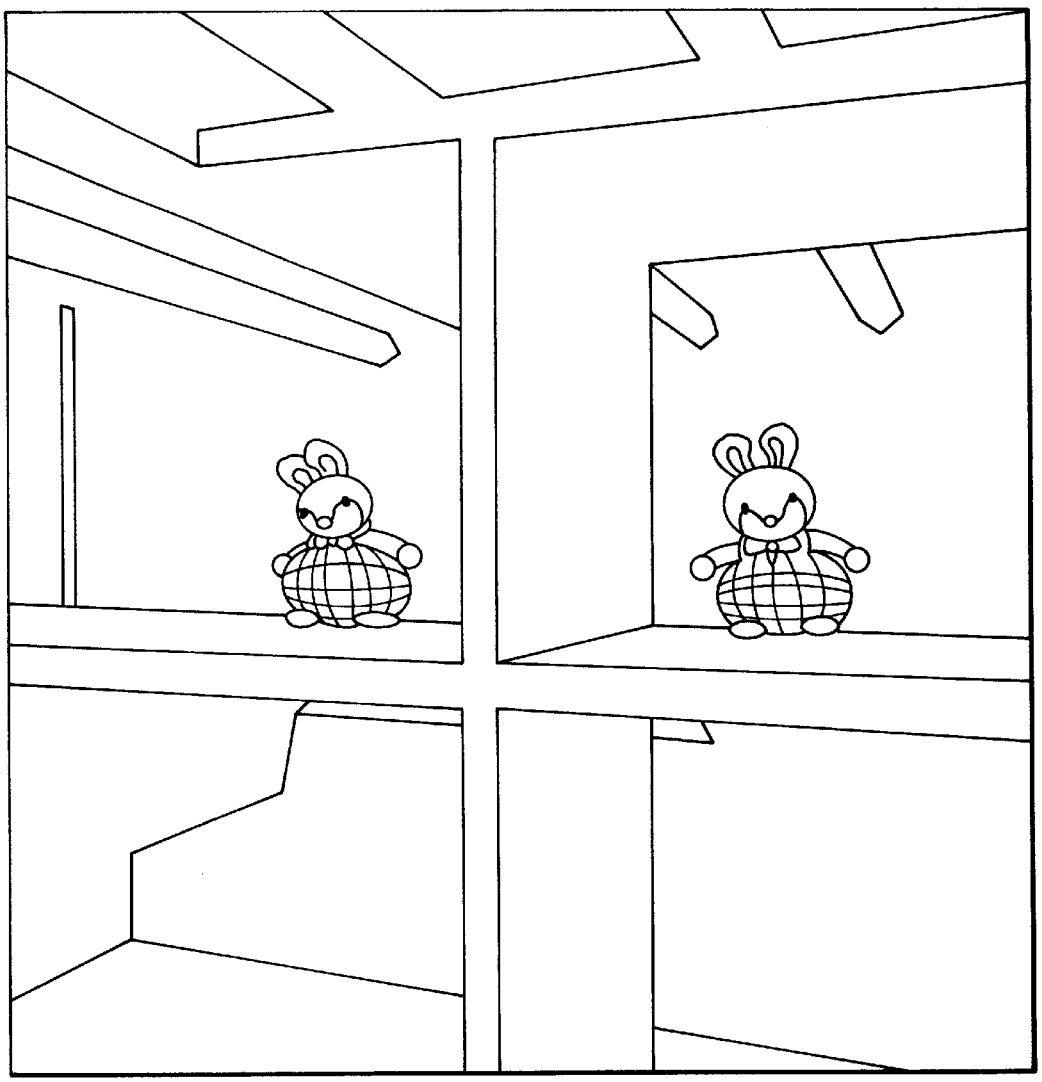
FIG. 23 is a view showing the virtual environment being viewed in the third embodiment.

FIG. 23 shows a display example of the drawing screen of a given virtual environment. In FIG. 23, a rabbit doll is described by the light space data, and the room is described by the shape model.

(d) Fourth Embodiment

In the third embodiment, a display image is generated from the light space data. In place of using the light space data, an image necessary for display can also be generated from multi-viewpoint images by the same method as in the second embodiment.

The present invention can be applied to either a system built by a plurality of devices or an apparatus consisting of a single device. Needless to say, the present invention can also be applied to a case wherein the invention is attained by supplying a program to the system or apparatus. In this case, a storage medium that stores the program according to the present invention constitutes the present invention. By loading the program from the storage medium to the system or apparatus, the system or apparatus operates in accordance with the predetermined method.

As described in detail above, according to the above embodiments, the following effects are expected.

An object with a very complex shape can be reconstructed by describing it on the basis of its way of view.

Even when the images to be presented finally must be taken in advance, the data volume of images which must be prepared to artificially obtain an arbitrary viewpoint position and direction upon viewing can be reduced greatly.

Even when images from every positions in the three-dimensional space are to be presented, the data volume of required light space data can be reduced.

Even when the viewpoint position is to be arbitrarily moved, phototaking of a panorama image can be facilitated, and the data volume of panorama images to be prepared can be greatly reduced.

Furthermore, by utilizing the characteristics of the conventional methods (1) to (5) which are originally independent techniques, shape model data and an actually taken image can be easily generated and fused to display an image with high reality.

What is claimed is:

1. An image processing method of generating and displaying a virtual environment, comprising:

a model space rebuilding step of generating a three-dimensional space using shape model data, and rebuilding the space as a first image of the three-dimensional space in accordance with a first drawing specification at a given viewpoint;

an actually taken image-based image generation step of generating a second image of an object different from said three-dimensional space, said generating being performed from an arbitrary viewpoint on the basis of an actually taken image in accordance with a second drawing specification that uses the same view condition as a view condition used by the first drawing specification; and an image fusion step of fusing the first image rebuilt in the model space rebuilding step and the second image generated in the actually taken image-based image generation step, on the basis of arrangement data indicating the arrangement of the second image with respect to the first image.

2. A method according to claim 1, wherein the actually taken image-based image generation step uses light space data as the actually taken image.

3. A method according to claim 1, wherein the model space rebuilding step includes the step of rebuilding the image using, as the first drawing specification, a perspective transformation derived from a position and direction of the viewpoint and an angle of view.

4. A method according to claim 1, wherein the model space rebuilding step includes the step of rebuilding the image using, as the first drawing specification, an orthogonal projection transformation derived from a position and direction of the viewpoint.

5. A method according to claim 1, wherein the image fusion step includes the step of fusing two drawn images by displaying an image drawn based on the shape model data on a screen first, and thereafter, overwriting an image drawn based on the actually taken image on the screen.

6. A method according to claim 1, wherein the shape model data in the model space rebuilding step is not data that expresses only a geometric shape but is data also including a surface characteristic and pattern of the geometric shape.

7. A method according to claim 1, wherein the actually taken image-based image generation step comprises the image reconstruction step of reconstructing an image from a plurality of images taken from a plurality of positions.

8. A method according to claim 7, wherein the actually taken image-based image generation step comprises the distortion correction step of correcting distortion of an image upon reconstructing the image in the image reconstruction step.

9. An image processing apparatus for generating and displaying a virtual environment, comprising:

model space rebuilding means for generating a three-dimensional space using shape model data, and rebuilding the space as a first image of the three-dimensional space in accordance with a first drawing specification at a given viewpoint;

actually taken image-based image generation means for generating a second image of an object different from said three-dimensional space, said generating being performed from an arbitrary viewpoint on the basis of an actually taken image in accordance with a second drawing specification that uses the same view condition as a view condition used by the first drawing specification; and image fusion means for fusing the first image rebuilt by said model space rebuilding means and the second image generated by said actually taken image-based image generation means, on the basis of arrangement data indicating the arrangement of the second image with respect to the first image.

10. An apparatus according to claim 9, wherein said actually taken image-based image generation means uses light space data as the actually taken image.

11. An apparatus according to claim 9, wherein said model space rebuilding means includes rebuilds the image using, as the first drawing specification, a perspective transformation derived from a position and direction of the viewpoint and an angle of view.

12. An apparatus according to claim 9, wherein said model space rebuilding means rebuilds the image using, as the first drawing specification, an orthogonal projection transformation derived from a position and direction of the viewpoint.

13. An apparatus according to claim 9, wherein said image fusion means fuses two drawn images by displaying an image drawn based on the shape model data on a screen first, and thereafter, overwriting an image drawn based on the actually taken image on the screen.

14. An apparatus according to claim 9, wherein the shape model data used by said model space rebuilding means is not data that expresses only a geometric shape but is data also including a surface characteristic and pattern of the geometric shape.

15. An apparatus according to claim 9, wherein said actually taken image-based image generation means comprises image reconstruction means for reconstructing an image from a plurality of images taken from a plurality of positions.

16. An apparatus according to claim 15, wherein said actually taken image-based image generation means comprises distortion correction means for correcting distortion of an image upon reconstructing the image by said image reconstruction means.

17. An image processing method of generating a virtual environment, comprising:

a first description step of describing a shape of a first three-dimensional object and a shape of a three-dimensional space on the basis of information including a three-dimensional position, a three-dimensional direction, and a surface color;

a second description step of describing a second three-dimensional object different from the first three-dimensional object and three-dimensional space, said describing being performed on the basis of an actually taken image taken from an arbitrary position; and a generation step of generating the virtual environment by fusing the shapes described in the first description step and the second three-dimensional object described in the second description step, on the basis of arrangement data indicating the arrangement of the second three-dimensional object with respect to the three-dimensional space.

18. A method according to claim 17, wherein the generation step includes the step of generating the virtual environment by fusing the shapes described in the first description step and the three-dimensional object and the three-dimensional space described in the second description step by a tree structure which includes the shapes and the objects as constituent elements.

19. A method according to claim 18, further comprising:

the access step of searching and accessing all the constituent elements of the tree structure by a tree search method;

the drawing step of performing drawing suitable for each of the constituent elements accessed during the access step; and the changing step of changing a view condition of the virtual environment generated in the generation step.

20. A method according to any one of claims 17 to 19, wherein the first and second description steps perform the descriptions using light space data.

21. A method according to claim 19, wherein when the constituent element to be accessed is a shape model, the drawing step comprises:
the step of calculating a positional relationship between a viewpoint position and direction and the shape model; and
the step of displaying an image on a display screen using a perspective transformation or an orthogonal projection transformation on the basis of the calculated relationship.

22. A method according to claim 19, wherein when the constituent element to be accessed is light space data, the drawing step comprises:
the step of calculating a positional relationship between a viewpoint position and direction and the light space data; and
the step of generating an image to be presented from the light space data on the basis of the calculated relationship.

23. A method according to claim 22, wherein when the constituent element to be accessed is light space data, the drawing step further comprises:
the step of calculating a distance between an arrangement position of the light space data and the viewpoint position; and
the step of discriminating depths of the constituent elements on the basis of the calculation result used as a depth value of the light space data.

24. A method according to claim 22, wherein the drawing step comprises:
the step of preparing a depth value storage map having a size for one screen,
when the constituent element to be accessed is a shape model, the drawing step further comprises:
the step of generating a drawing image to be drawn on a display screen;
the step of calculating distances between a viewpoint and pixels of the shape model corresponding to pixel positions on the display screen; and
the step of displaying the drawing image by storing the distances in the depth value storage map in units of pixels when no depth values are stored in the depth value storage map, and displaying the drawing image on the display screen by storing the distances in the depth value storage map in units of pixels when the depth values are stored in the depth value storage map and when the calculated distances are compared with the corresponding depth values stored in the depth value storage map in units of pixels and the depth value is smaller than the corresponding distance, and
when the constituent element to be accessed is light space data, the drawing step further comprises:
the step of generating an image to be presented on the basis of the light space data;
the depth value approximation step of calculating a distance between a viewpoint position and an arrangement position of the light space data and determining the calculation result as an approximate depth value of the light space data; and
the step of displaying the generated image on the display screen by storing the approximate depth value in the depth value storage map in units of pixels when no depth value is stored in the depth value storage map, and displaying a pixel of the generated pixel on the display screen by storing the approximate depth value in the depth value storage map in units of pixels when the depth value is stored in the depth value storage map and when the approximate depth value is compared with the depth value in the depth value storage value in units of pixels and the approximate depth value is smaller than the stored depth value.

25. An image processing apparatus for generating a virtual environment, comprising:
first description means for describing a shape of a first three-dimensional object and a shape of a three-dimensional space on the basis of information including a three-dimensional position, a three-dimensional direction, and a surface color;
second description means for describing a second three-dimensional object different from the first three-dimensional object and the three-dimensional space, said describing being performed on the basis of an actually taken image taken from an arbitrary position; and
generation means for generating the virtual environment by fusing the shapes described by said first description means and the second three-dimensional object described by said second description means, on the basis of arrangement data indicating the arrangement of the second three-dimensional object with respect to the three-dimensional space.

26. An apparatus according to claim 25, wherein said generation means generates the virtual environment by fusing the shapes described by said first description means and the three-dimensional object and the three-dimensional space described by said second description means by a tree structure which includes the shapes and the objects as constituent elements.

27. An apparatus according to claim 26, further comprising:
access means for searching and accessing all the constituent elements of the tree structure by a tree search method;
drawing means for performing drawing suitable for each of the constituent elements accessed during accessing by said access means; and
changing means for changing a view condition of the virtual environment generated by said generation means.

28. An apparatus according to any one of claims 25 to 27, wherein said first and second description means perform the descriptions using light space data.

29. An apparatus according to claim 27, wherein when the constituent element to be accessed is a shape model, said drawing means comprises:
means for calculating a positional relationship between a viewpoint position and direction and the shape model; and
means for displaying an image on a display screen using a perspective transformation or an orthogonal projection transformation on the basis of the calculated relationship.

30. An apparatus according to claim 27, wherein when the constituent element to be accessed is light space data, said drawing means comprises:
means for calculating a positional relationship between a viewpoint position and direction and the light space data; and
means for generating an image to be presented from the light space data on the basis of the calculated relationship.

31. An apparatus according to claim 29, wherein when the constituent element to be accessed is light space data, said drawing means further comprises:

means for calculating a distance between an arrangement position of the light space data and the viewpoint position; and means for discriminating depths of the constituent elements on the basis of the calculation result used as a depth value of the light space data.

32. An apparatus according to claim 29, wherein said drawing means comprises:

means for preparing a depth value storage map having a size for one screen, when the constituent element to be accessed is a shape model, said drawing means further comprises:

means for generating a drawing image to be drawn on a display screen;

means for calculating distances between a viewpoint and pixels of the shape model corresponding to pixel positions on the display screen; and means for displaying the drawing image by storing the distances in the depth value storage map in units of pixels when no depth values are stored in the depth value storage map, and displaying the drawing image on the display screen by storing the distances in the depth value storage map in units of pixels when the depth values are stored in the depth value storage map and when the calculated distances are compared with the corresponding depth values stored in the depth value storage map in units of pixels and the depth value is smaller than the corresponding distance, and when the constituent element to be accessed is light space data, said drawing means further comprises:

means for generating an image to be presented on the basis of the light space data;

depth value approximation means for calculating a distance between a viewpoint position and an arrangement position of the light space data and determining the calculation result as an approximate depth value of the light space data; and means for displaying the generated image on the display screen by storing the approximate depth value in the depth value storage map in units of pixels when no depth value is stored in the depth value storage map, and displaying a pixel of the generated pixel on the display screen by storing the approximate depth value in the depth value storage map in units of pixels when the depth value is stored in the depth value storage map and when the approximate depth value is compared with the depth value in the depth value storage value in units of pixels and the approximate depth value is smaller than the stored depth value.

* * * * *

UNITED STATES PATENT AND TRADEMARK OFFICE
CERTIFICATE OF CORRECTION

| | | |
|---|---|---|
| PATENT NO. | : 6,268,862 B1 | |
| APPLICATION NO. | : 08/812388 | |
| DATED | : July 31, 2001 | |
| INVENTOR(S) | : Shinji Uchiyama et al. | |

It is certified that error appears in the above-identified patent and that said Letters Patent is hereby corrected as shown below:

[54] TITLE OF THE INVENTION:

"THREE DIMENSIONAL" should read --THREE-DIMENSIONAL--.

After "Primary Examiner", insert the following:

--[74] Attorney, Agent, or Firm--Fitzpatrick, Cella, Harper & Scinto--.

COLUMN 4:

Line 14, "and a three-dimensional space" should read --different from the first object--.
Line 19, "and the three-dimensional" should be deleted.
Line 20, "space" should be deleted.

COLUMN 6:

Line 28, "ω" should read --Ψ--.

COLUMN 8:

Line 2, "step S208," should read --S218,--.
Line 24, "step S208," should read --S218,--.

COLUMN 11:

Line 48, "step S403" should read --step S405--.
Line 49, "S404" should read --S406--.

COLUMN 13:

Line 10, "mode" should read --node--.

COLUMN 14:

Line 44, "positions" should read --position--.

COLUMN 15:

Line 67, "includes" should be deleted.

UNITED STATES PATENT AND TRADEMARK OFFICE
CERTIFICATE OF CORRECTION

PATENT NO. : 6,268,862 B1
APPLICATION NO. : 08/812388
DATED : July 31, 2001
INVENTOR(S) : Shinji Uchiyama et al.

It is certified that error appears in the above-identified patent and that said Letters Patent is hereby corrected as shown below:

COLUMN 17:

Line 67, "pixel" should read --image--.

COLUMN 18:

Line 5, "value" (third occurrence) should read --map--.

COLUMN 20:

Line 19, "pixel" should read --image--.
Line 25, "value" should read --map--.

Signed and Sealed this

Nineteenth Day of February, 2008

JON W. DUDAS
*Director of the United States Patent and Trademark Office*